United States Patent
Mitsui et al.

(10) Patent No.: US 11,310,419 B2
(45) Date of Patent: *Apr. 19, 2022

(54) SERVICE SYSTEM, INFORMATION PROCESSING APPARATUS, AND SERVICE PROVIDING METHOD

(71) Applicant: RICOH COMPANY, LTD., Tokyo (JP)

(72) Inventors: Satoshi Mitsui, Kanagawa (JP); Kei Kushimoto, Kanagawa (JP); Kohichi Nishide, Kanagawa (JP); Tomotoshi Sato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,328

(22) Filed: Aug. 17, 2020

(65) Prior Publication Data

US 2020/0382701 A1    Dec. 3, 2020

Related U.S. Application Data

(63) Continuation of application No. 16/395,721, filed on Apr. 26, 2019, now Pat. No. 10,791,267, which is a
(Continued)

(30) Foreign Application Priority Data

Dec. 5, 2014  (JP) ................................ 2014-247212
Nov. 20, 2015 (JP) ................................ 2015-227585

(51) Int. Cl.
*H04N 5/232* (2006.01)
*H04N 21/2743* (2011.01)
(Continued)

(52) U.S. Cl.
CPC ..... *H04N 5/23238* (2013.01); *H04N 1/00103* (2013.01); *H04N 1/00244* (2013.01);
(Continued)

(58) Field of Classification Search
CPC .......... H04N 5/23238; H04N 5/23229; H04N 21/816; H04N 21/4524; H04N 21/25841;
(Continued)

(56) References Cited

U.S. PATENT DOCUMENTS 5,563,650 A    10/1996  Poelstra
2006/0055775 A1*  3/2006 Nou ..................... G08G 1/0962
                                                  348/118
(Continued)

FOREIGN PATENT DOCUMENTS

JP    H07-504285      5/1995
JP    2006-331260 A   12/2006
(Continued)

OTHER PUBLICATIONS

Office Action dated Aug. 13, 2019 in Japanese Patent Application No. 2015-227585.
(Continued)

*Primary Examiner* — Nam D Pham
(74) *Attorney, Agent, or Firm* — Xsensus LLP

(57) ABSTRACT

A service system includes a mobile terminal and an information processing device capable of communication via a network. The mobile terminal includes a first transmission unit that transmits spherical images taken in respective imaging locations and positional information about the imaging locations to the information processing device. The information processing device includes a reception unit that receives the spherical images transmitted by the first transmission unit; a map data obtaining unit that obtains map data from a map data storage, the map data including the imaging locations of the spherical images; a path information creation unit that creates information about a path made by connecting the imaging locations in the map data obtained by the map data obtaining unit; and a content providing unit
(Continued)

that makes content available for a request through the network, the content including the map data, the information about the path, and the spherical images.

20 Claims, 25 Drawing Sheets

Related U.S. Application Data continuation of application No. 15/869,953, filed on Jan. 12, 2018, now Pat. No. 10,326,934, which is a continuation of application No. 14/955,699, filed on Dec. 1, 2015, now Pat. No. 9,906,720.

(51) Int. Cl.

| | |
|---|---|
| *H04N 21/4223* | (2011.01) |
| *H04N 21/81* | (2011.01) |
| *H04N 1/00* | (2006.01) |
| *H04N 1/21* | (2006.01) |
| *H04N 21/258* | (2011.01) |
| *H04N 21/45* | (2011.01) |
| *H04N 1/32* | (2006.01) |
| *H04N 5/225* | (2006.01) |

(52) U.S. Cl.
CPC ....... *H04N 1/2112* (2013.01); *H04N 1/32128* (2013.01); *H04N 5/23229* (2013.01); *H04N 21/25841* (2013.01); *H04N 21/2743* (2013.01); *H04N 21/4223* (2013.01); *H04N 21/4524* (2013.01); *H04N 21/812* (2013.01); *H04N 21/816* (2013.01); *H04N 5/2258* (2013.01); *H04N 2201/3247* (2013.01); *H04N 2201/3252* (2013.01); *H04N 2201/3273* (2013.01); *H04N 2201/3278* (2013.01)

(58) Field of Classification Search
CPC ............. H04N 1/2112; H04N 21/2743; H04N 1/00244; H04N 21/812; H04N 21/4223; H04N 1/00103; H04N 5/2258
See application file for complete search history.

(56) References Cited

U.S. PATENT DOCUMENTS

| | | |
|---|---|---|
| 2008/0291201 A1 | 11/2008 | Lafon |
| 2010/0046803 A1 | 2/2010 | Tomita |
| 2011/0205396 A1 | 8/2011 | Jin |
| 2013/0263016 A1 | 10/2013 | Lehtiniemi et al. |
| 2013/0326419 A1 | 12/2013 | Harada et al. |
| 2015/0213362 A1 | 7/2015 | Ohwa et al. |

FOREIGN PATENT DOCUMENTS

| | | |
|---|---|---|
| JP | 2008-58917 A | 3/2008 |
| JP | 2008-170930 A | 7/2008 |
| JP | 2009-239621 A | 10/2009 |
| JP | 2010-531007 A | 9/2010 |
| JP | 2014-006880 | 1/2014 |
| WO | WO 2014/129042 A1 | 8/2014 |

OTHER PUBLICATIONS

Office Action dated Mar. 2, 2021 in corresponding Japanese Patent Application No. 2020-055428, 3 pages.

\* cited by examiner

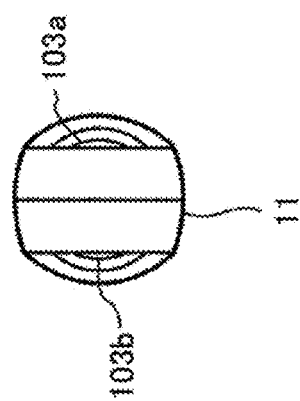
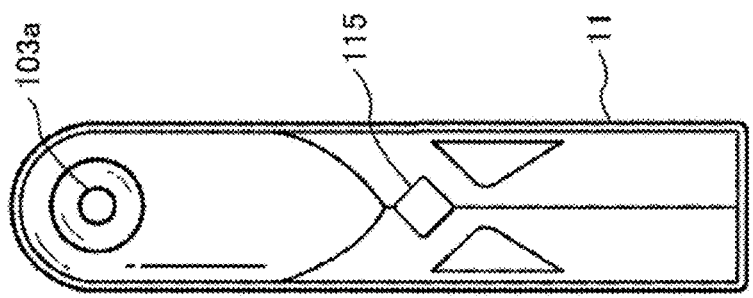
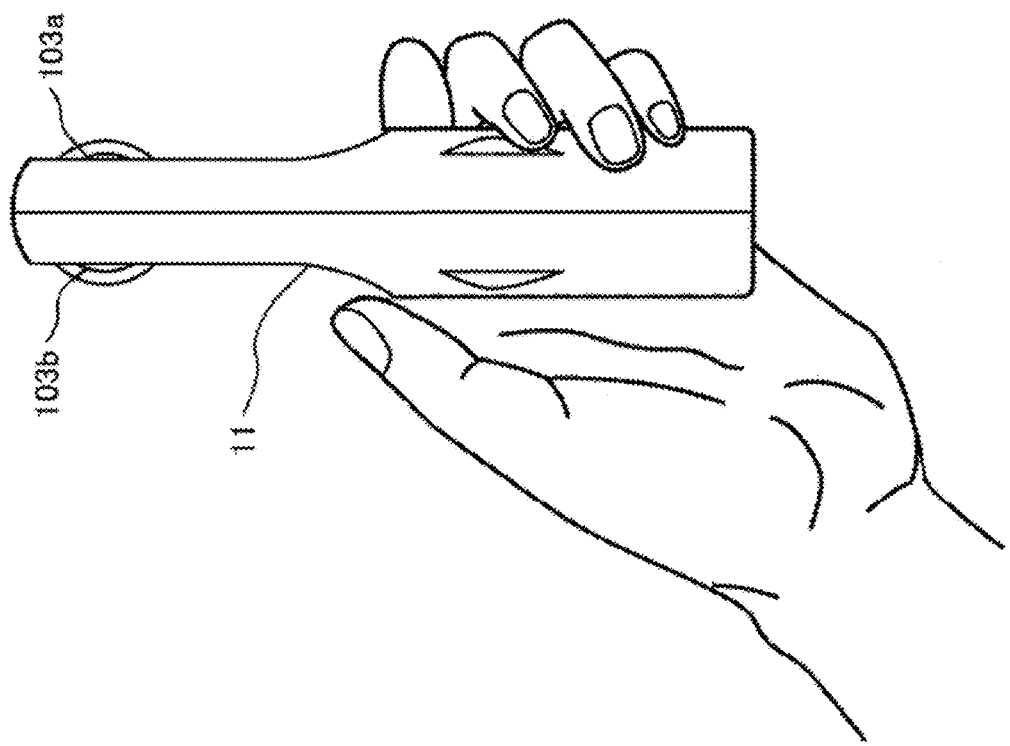

FIG.12A

```
<html>
<head>
(HEADER ELEMENT)
</head>
<body>
<h1>TITLE</h1>
<img ***/images/img001.gif>
</body>
</html>
```

FIG.12B

```
<iframe width="420" height="315" src="//www.youtune.com/4000/001/001-A" frameborder="0" allowfullscreen>
</iframe>
```

FIG.12C

```
<html>
<head>
(HEADER ELEMENT)
</head>
<body>
<h1>TITLE</h1>
<img ***/images/img001.gif>
<iframe width="420" height="315" src="//www.youtune.com/4000/001/001-A" frameborder="0" allowfullscreen>
</iframe>
</body>
</html>
```

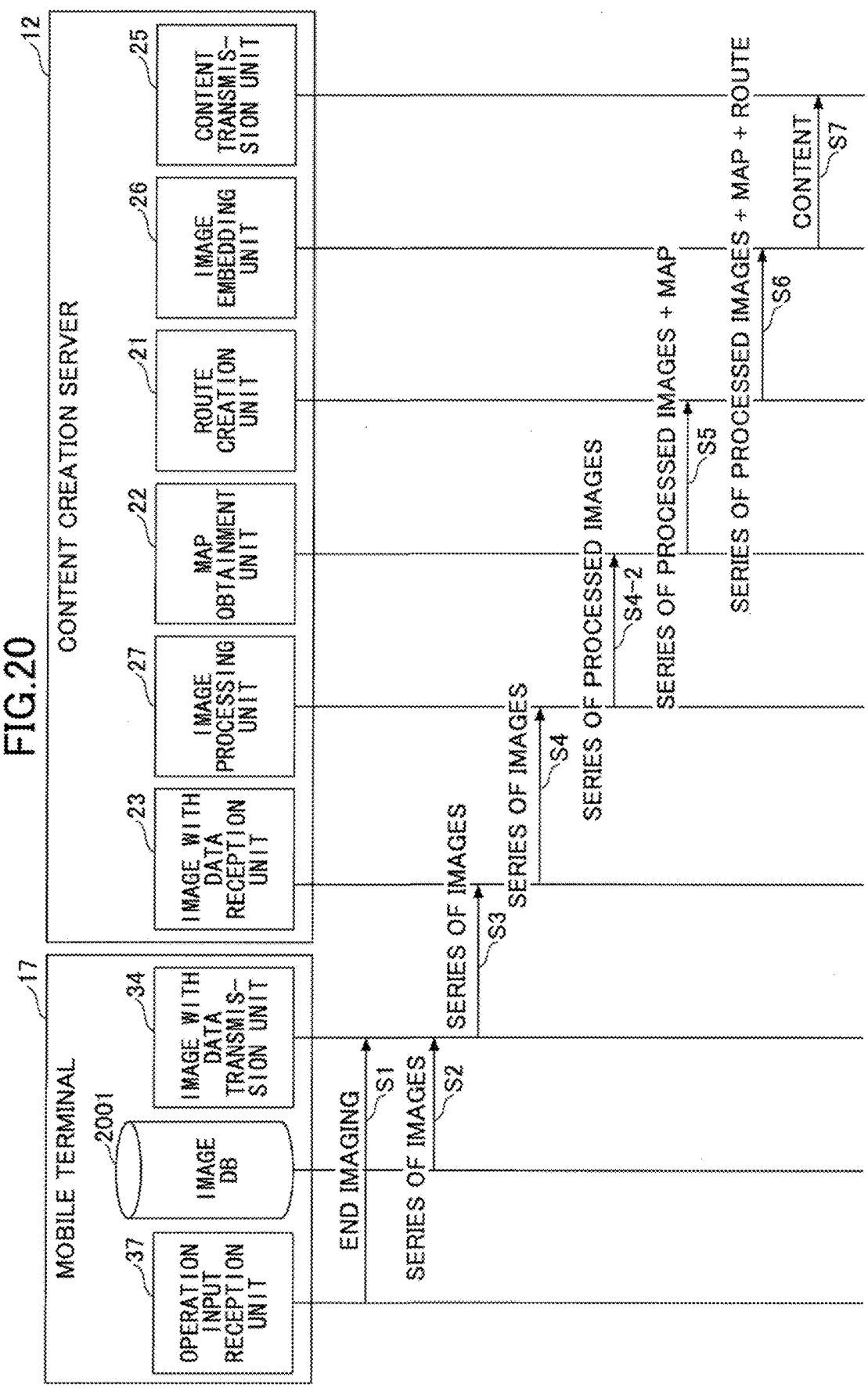

FIG.23A
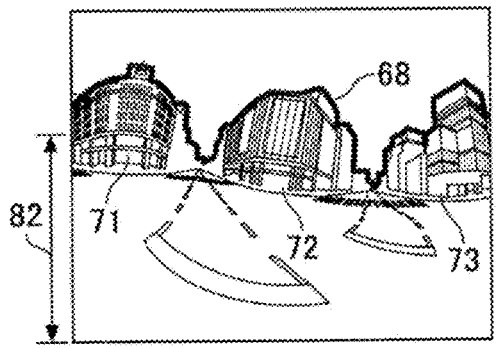
FIG.23B
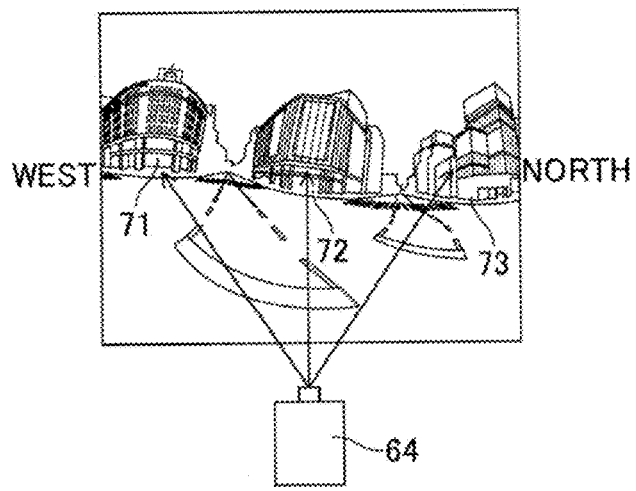
FIG.23C
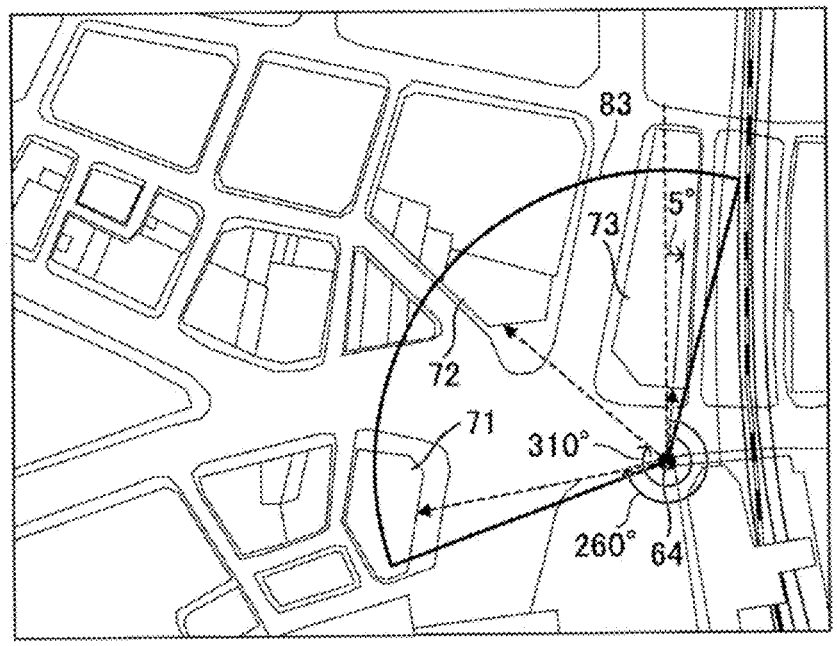

SERVICE SYSTEM, INFORMATION PROCESSING APPARATUS, AND SERVICE PROVIDING METHOD

CROSS-REFERENCE TO RELATED APPLICATIONS

This application is a continuation application of U.S. application Ser. No. 16/395,721, filed Apr. 26, 2019, which is a continuation application of U.S. application Ser. No. 15/869,953, filed Jan. 12, 2018, now U.S. Pat. No. 10,326,934, which is a continuation of U.S. application Ser. No. 14/955,699, filed Dec. 1, 2015, now U.S. Pat. No. 9,906,720, issued Feb. 27, 2018. This application is based upon and claims the benefit of priority from the prior Japanese Patent Applications Nos. 2014-247212, filed Dec. 5, 2014, and 2015-227585, filed Nov. 20, 2015. The entire contents of each of the above-identified applictions are incorporated herein by reference.

BACKGROUND OF THE INVENTION

Field of the Invention

The present invention relates to a service system, an information processing apparatus, and a service providing method.

Description of the Related Art

Information service using a network has been one of key areas of marketing and many pictures and videos are posted on Web pages. A user who browses the Web pages can see the scenery of a place taken in images and grasp surrounding circumstances thereof by browsing pictures and videos posted in consideration of a theme and descriptions of the Web pages. For example, if the theme of Web pages is tourism, a user sees the scenery of the tourist sites and grasps surrounding circumstances thereof by thinking that pictures and videos posed on the Web pages are related to tourist sites.

However, generally-used cameras have a limited imaging range and a user who browses pictures and videos can see scenery and grasp surrounding circumstances only in a range of the pictures and videos that have been taken. By contrast, if the surroundings are captured in an image using a camera with a wide angle of view such as a fish-eye lens, a user who browses pictures can see wider scenery and grasp wider surrounding circumstances just by browsing a single image (see Patent Document 1, for example). Patent Document 1 discloses a method for forming a panoramic image, in which an image taken using a fish-eye optical device is converted into a panoramic image. A part of the panoramic image and an imaging location indicated by a point are displayed on a map.

However, since the method for forming a panoramic image disclosed in Patent Document 1 employs a single fish-eye lens, an imaging range thereof is still limited in many respects. Further, how to present taken pictures and videos to users is not considered.

[Patent Document 1] Japanese Translation Publication No. H7-50428 5 of PCT International Application

SUMMARY OF THE INVENTION

It is a general object of at least one embodiment of the present invention to provide a service system that can easily provide pictures and videos that have a wide imaging range.

In an embodiment, a service system including a mobile terminal and an information processing device capable of communication via a network is provided. The mobile terminal includes a first transmission unit that transmits a plurality of spherical images taken in respective imaging locations and positional informal ion about the imaging locations to the information processing device. The information processing device includes a reception unit that receives the spherical images transmitted by the first transmission unit; a map data obtaining unit that obtains map data from a map data storage, the map data including the imaging locations of the spherical images a path information creation unit that creates information about a path made by connecting the imaging locations in the map data obtained by the map data obtaining unit; and a content providing unit that makes content available for a request through the network, the content including the map data, the information about the path, and the spherical images.

According to an embodiment of the present invention, it is possible to provide a service system that can easily provide pictures and videos that have a wide imaging range.

BRIEF DESCRIPTION OF THE DRAWINGS

Other objects and further features of embodiments will become apparent from the following detailed description when read in conjunction with the accompanying drawings, in which:

FIG. 5A is a diagram illustrating an appearance of an imaging device;

FIG. 5B is a diagram illustrating an appearance of an imaging device

FIG. 5C is a diagram illustrating an appearance of an imaging device;

FIG. 12A is a diagram illustrating embedding of a Uniform Resource Identifier (URI) in a Web page;

FIG. 12B is a diagram illustrating embedding of a URI in a Web page;

FIG. 12C is a diagram illustrating embedding of a URI in a Web page;

FIG. 20 is a sequence diagram of a procedure by which a content creation server creates content;

FIG. 23A is a diagram illustrating how to identify a location of a building on a map;

FIG. 23B is a diagram illustrating how to identify a location of a building on a map;

FIG. 23C is a diagram illustrating bow to identify a location of a building on a map;

DETAILED DESCRIPTION OF THE PREFERRED EMBODIMENTS

In the following, embodiments of the present invention will be described with reference to the accompanied drawings.

Embodiment 1

<Outline of Web Service in the Present Embodiment>

Figure 1:
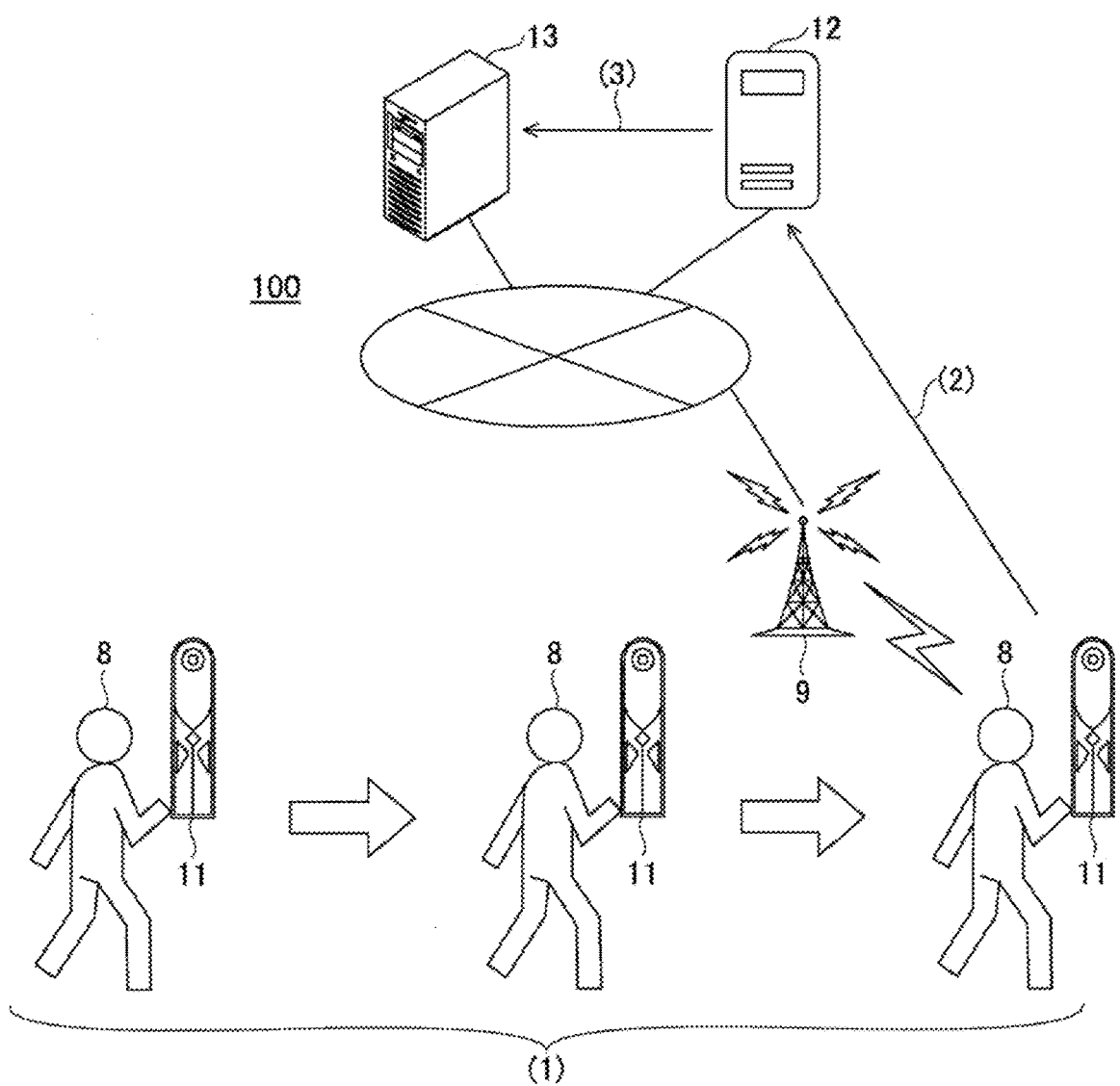
FIG. 1 is a diagram illustrating an operation performed by a photographer.

An outline of Web service in the present embodiment will be described with reference to FIGS. 1 to 3. FIG. 1 is a diagram illustrating an operation performed by a photographer.

(1) A photographer 8 walks while gripping an imaging device 11 capable of taking an image of 360 degrees of surroundings (hereafter "omnidirectional surroundings"). The imaging device 11 is set to take an image of surroundings at regular intervals or at each fixed distance. The imaging device 11 associates the taken image (spherical linage to be described later) with an imaging location and stores the taken image. Accordingly, it is possible to obtain an image along a route that the photographer 8 has walked.

(2) When the photographer 8 has walked to a destination and taking images on the route ends, the photographer 8 transmits a plurality of images to a content creation server 12 via an access point 9.

(3) The content creation server 12 creates content using a map including the route that the photographer 8 has walked and the images and registers the content with a content providing server 13. In an example to be described later, a mobile terminal that receives an image from the imaging device 11 transmits the image to the content providing server 13.

Figure 2:
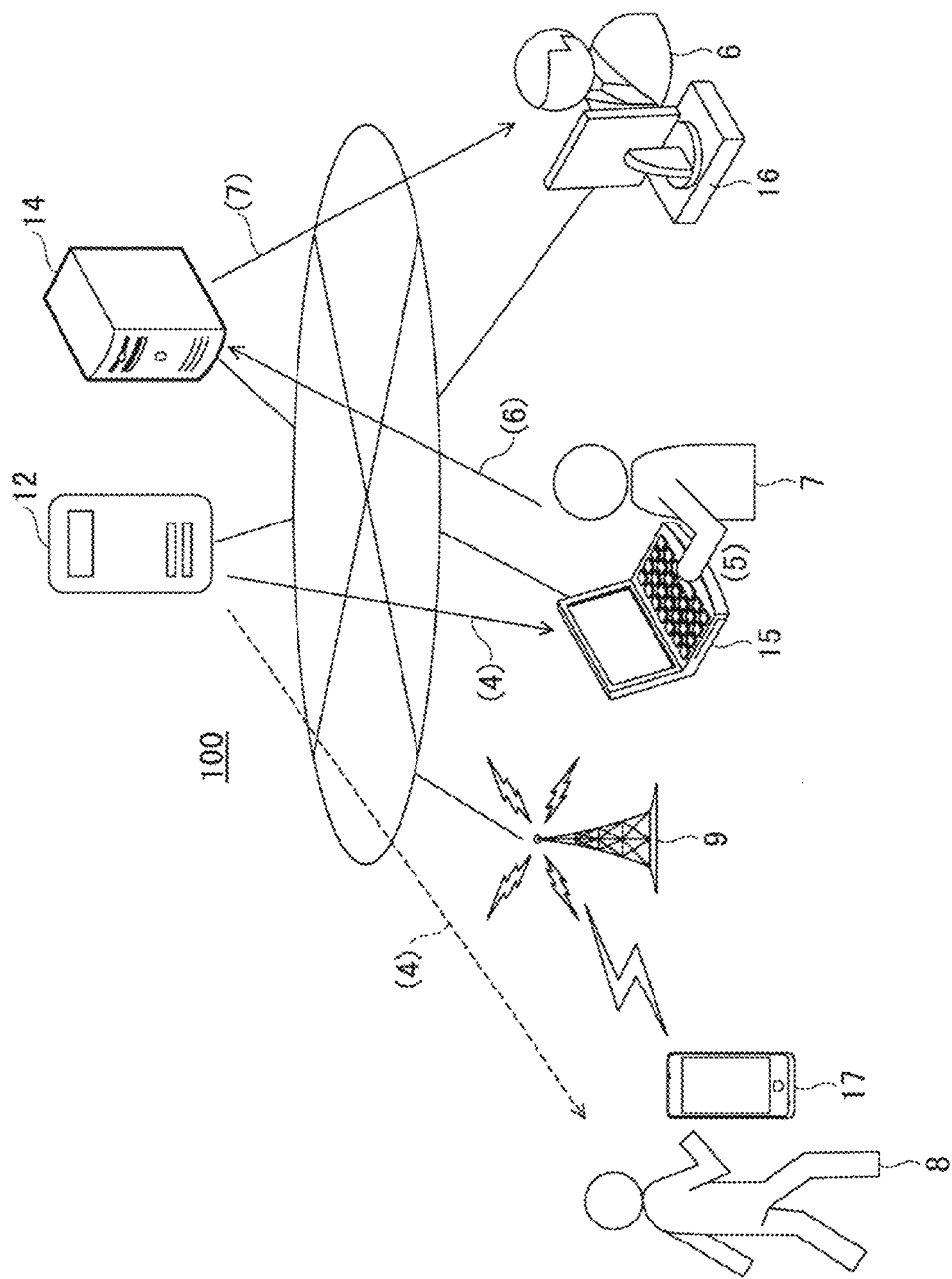
FIG. 2 a diagram illustrating how to set content of a Web page by a company that uses the content.

FIG. 2 a diagram, illustrating bow to set content of a Web page by a company that uses the content.

(4) The content creation server 12 creates content to be described later and registers the content. The content creation server 12 transmits a Uniform Resource Identifier (URI) of the content to a person 7 in charge in the content-using company, the person 7 in charge being registered in advance. In addition, the content creation server 12 may also transmit the URI to the photographer 8 who transmitted the image as indicated in a dotted line of (4).

(5) The person 7 in charge in the content-using company operates a Personal Computer (PC) 15 of the content-using company to input (copy and paste, for example) the URI of the content in HTML data about a Web page (such as a Web site) of the company. In accordance with this, the content-using company can link surrounding images taken along the route that the photographer 8 has walked to the company's Web page.

(6) The person 7 in charge in the content-using company registers (transmits) the Web page with a Web server 14 of the company. Accordingly, an end user 6 can browse the web page of the content-using company, in which contents are linked.

(7) The end user 6 who browses the Web page of the content-using-company operates a user's PC 16 to display the content.

Figure 3:
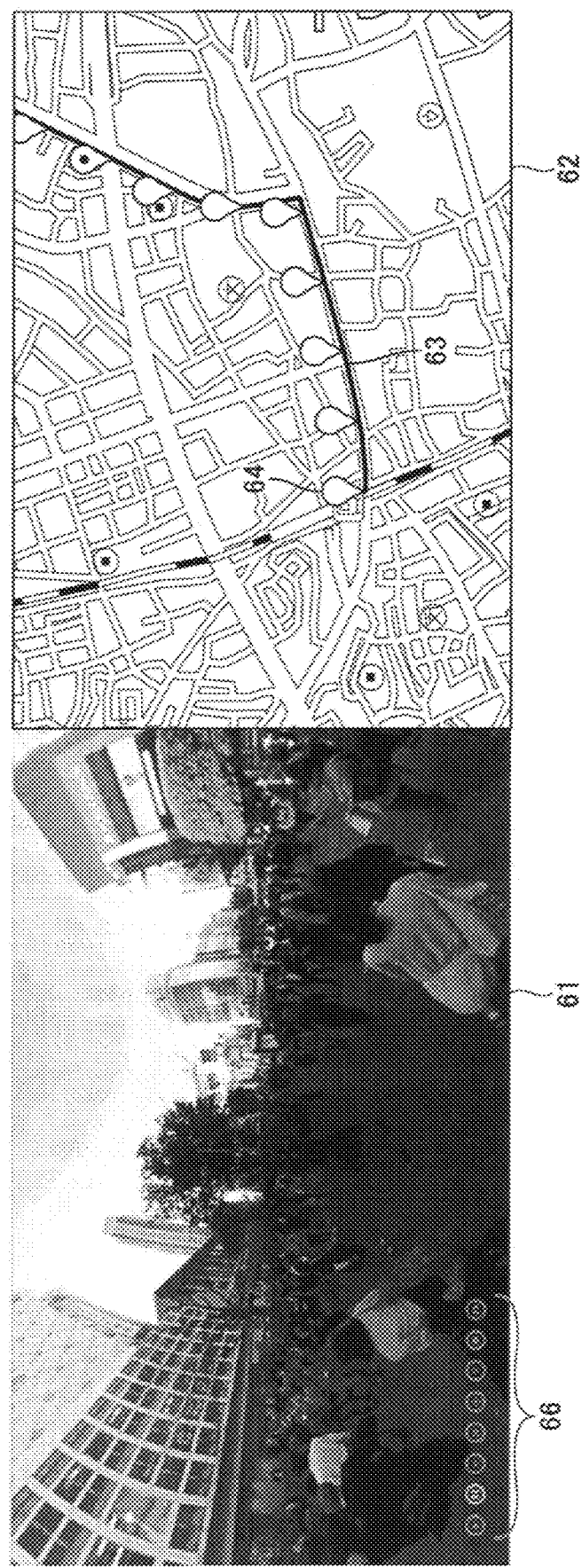
FIG. 3 is a diagram showing content browsed by an end user who accesses a Web page of a content-using company.

FIG. 3 is a diagram showing content browsed by the end user 6 who accesses the Web page of the content-using company. A surrounding image 61 and a map 62 are mainly displayed as the content. The surrounding image 61 is an image of omnidirectional surroundings (spherical image) in each imaging location on the route that the photographer 8 has walked to take images. In addition, the spherical image may also be called a spherical panoramic image, an omnidirectional image, or an image of 360 degrees of surroundings. Since an area of the image displayed at once is a part of the spherical image, the end user 6 can browse the image in all directions by operating the user's PC 16. Further, on the map 62, a route 63 that the photographer 8 has walked is emphatically displayed. Since an imaging location 64 is clearly displayed on the route 63, the end user 6 can understand an image of which imaging location 64 the end user 6 is browsing.

Accordingly, the end user 6 may have a simulated experience as if the end user 6 were actually walking on the above-mentioned route 63. Further, the route 63 is emphatically displayed on the map 62 such that the end user 6 can understand, at first sight, the imaging location 64 of the image 61 currently displayed and an imaging location 64 of an image to be displayed. Further, the end user 6 can operate the PC 16 to display an image of a desired location on the route 63.

In this manner, with a Web service system 100 according to the present embodiment, everyone can easily create and publish content with presence in which space of omnidirectional surroundings is expressed. The Web service system 100 can provide the end user 6 with a simulated experience of touring on a route by replaying an omnidirectional panoramic image.

<Terms>

The content-using company refers to a corporate body, a natural person, a group, or an individual that wishes to introduce a route using content. The content-using company need not be a commercial company.

The Web service system 100 provides the content using company with a service to support the creation and publication of content.

Examples of the route (an example of a path or path information) include a tourist route at a tourist site, a walking course for mountain climbing or hiking, a running course for a marathon, a course to guide how to get to a destination such as from a station to an apartment, a course to introduce how to get to an attraction site or facilities in a theme park, and a course to introduce a shopping mall or stores in a department store. However, any place may be a route according to the present embodiment as long as people can walk to the place.

The end user 6 is a user who browses content via a Web page (and a Web application) operated by the content-using company.

Content has at least a plurality of images of omnidirectional surroundings. The map 62 and the route 63 may be included in the content. In addition, audio data collected at an imaging location may be included in the content.

Link information refers to information for a given information processing terminal such as the user's PC 16 to obtain content from a resource connected to a network. In the present embodiment, a URI is used for the descriptions as an example of the link information. The URI is information to identify the resource on the network and a Uniform Resource Locator (URL) is information-to specify a place of the resource on the network. The URL may be used instead of the URI.

Public information refers to information published on the network. The public information is accessible to the user's PC 16, for example. In the present embodiment, the public information is called a Web page in the descriptions. The Web page is a document published on the internet. The Web page may be prepared in advance or dynamically generated by a Web application. A URI may be embedded in the Web page.

<Configuration Examples>

Figure 4:
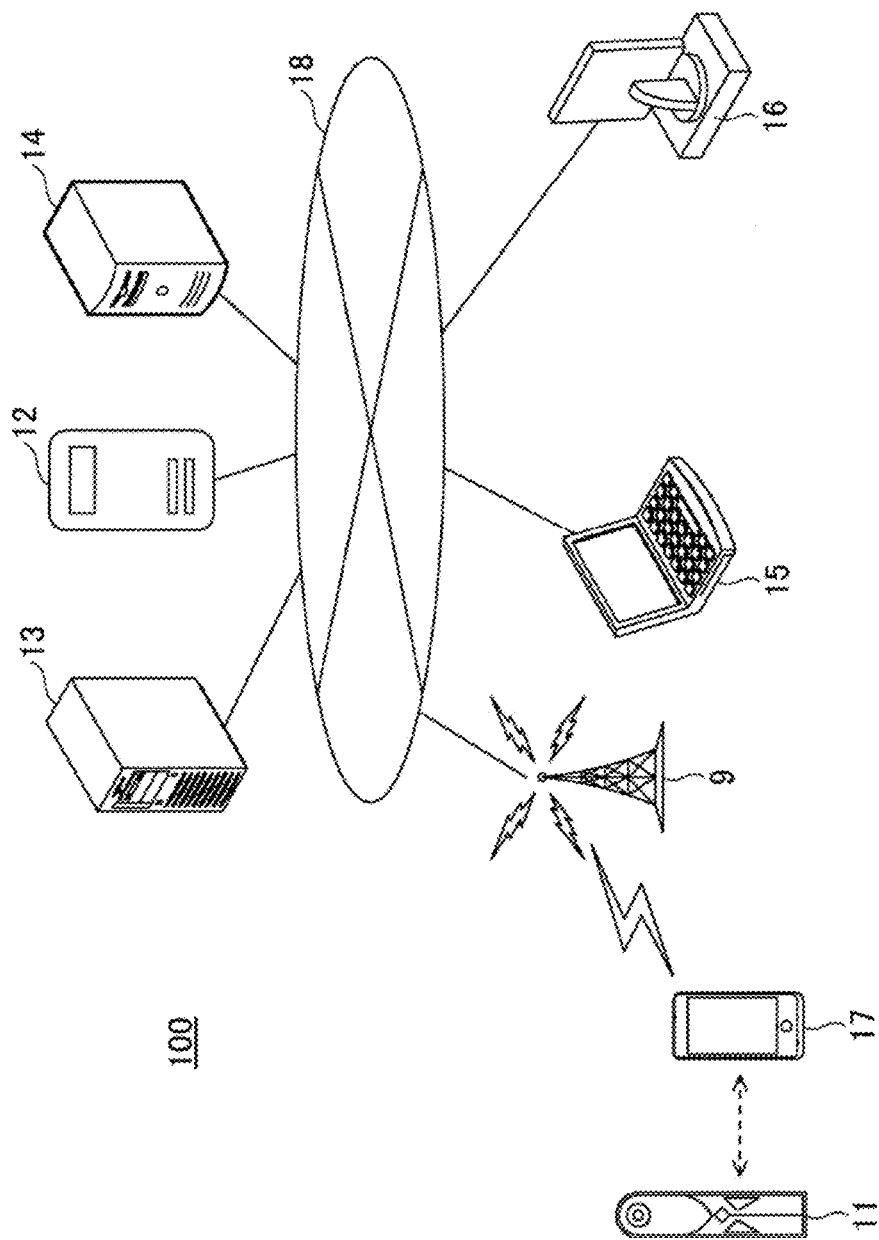
FIG. 4 is a configuration diagram of a Web service system.

FIG. 4 is a configuration diagram of the Web service system 100. The Web service system 100 includes the content creation server 12, the content providing server 13, the Web server 14, the imaging device 11, a mobile terminal 17, the content-using company's PC 15, and the user's PC 16, all being capable of communication via a network 18.

The network 18 is built with a LAW, a WAN, or the Internet, for example. The network 18 is mainly built with wires but a part or an entire portion of the network 18 may be built wirelessly. Further, the network 18 may include a mobile phone network such, as Personal Digital Cellular (PDC), Global System for Mobile communications (GSM) (registered trademark), CDMA, or LTE.

As mentioned above, the content creation server 12 is a server that creates content in which images are used and the content providing server 13 is a server that provides content to the end user 6. The Web server 14 is a server operated by the content-using company and a Web page of the content-using company is registered with the Web server 14. Information to be published by the content-using company is described in HTML or JavaScript (registered trademark) on the Web page.

The imaging device 11 is an omnidirectional imaging device capable of taking an image of 360 degrees of surroundings with two imaging elements disposed on the imaging device 11. The imaging device 11 does not need to be an imaging device dedicated for omnidirectional image taking. An omnidirectional imaging unit to be installed afterword may be attached to a normal digital camera or a smartphone, for example, to have substantially the same function as in the imaging device 11.

The imaging device 11 is capable of communicating with the mobile terminal 17 in a wired or wireless manner. This is because the mobile terminal 17 supports a function that the imaging device 11 does not have. In other words, if the imaging device 11 does not have a function of detecting positional information (such as a GPS reception function), the mobile terminal 17 detects an imaging location. In the present embodiment, the mobile terminal 17 adds the imaging location to an image taken by the imaging device 11 and transmits the image to the content creation server 12. If the imaging device 11 has a function of detecting positional information, the mobile terminal 17 may be eliminated. Accordingly, the imaging device 11 and the mobile terminal 17 may be provided by a single device.

The mobile terminal 17 has a display screen to display an image. The display screen is used when the photographer 8 confirms the image. However, the confirmation of the image is not mandatory.

Examples of the mobile terminal 17 include a smartphone, a Personal Digital Assistant (PDA), a tablet terminal, a mobile phone, a wearable PC, and a general-purpose PC. However, the mobile terminal 17 is not limited to these examples.

The content-using company's PC 15 is a PC operated by the person in charge in the content-using company when content is linked to a Web page to be published by the content-using company. Examples of the content-using company's PC 15 may be a PC, a smartphone, a PDA, a tablet terminal, a mobile phone, or a wearable PC.

The user's PC 16 is a PC operated by the end user 6 and displays a Web page provided by the content-using company. A specific device of the user's PC 16 may be the same as the content-using company's PC 15. The user's PC 16 is an example of an information processing terminal.

In FIG. 4, the content creation server 12, the content providing server 13, and the Web server 14 are shown as separate devices for ease of description. However, functions of these three servers may be provided by a single device. Further, any two of the functions of these three servers may be provided by a single device.

Further, the functions of at least one of the content creation server 12, the content providing server 13, and the Web server 14 may be provided as a cloud service in which cloud computing is used. In cloud computing, a plurality of servers are connected using L1 to L3 switches and each server is connected to at least one storage via a fiber channel or iSCSX, for example. In cloud computing, a virtualized server is added or released to or from each server depending on load, so that a physical configuration will be dynamically changed.

In this manner, the configuration of the Web service system 100 shown in the drawings is an example. The Web service system 100 may be any system as long as it has a function of an information processing apparatus capable of performing a process in the present embodiment to be described below.

<Imaging Device 11>

An appearance of the imaging device 11 is described with reference to FIGS. 5A to 5C. FIG. 5A is a left side view of the imaging device 11. FIG. 5B is a front view of the imaging device 11. FIG. 5C is a plan view of the imaging device 11.

As shown in FIG. 5A, the imaging device 11 includes a vertically long case that a human can grip with one hand and two imaging elements 103a and 103b on an upper portion of the imaging device 11, the two imaging elements 103a and 103b being disposed back to back relative to each other. Each of the imaging elements 103a and 103b has an imaging range of 180 degrees and the two imaging elements 103a and 103b take images of omnidirectional surroundings. An operation unit 115 such as a shutter button is disposed on a front side of the imaging device 11.

Figure 6:
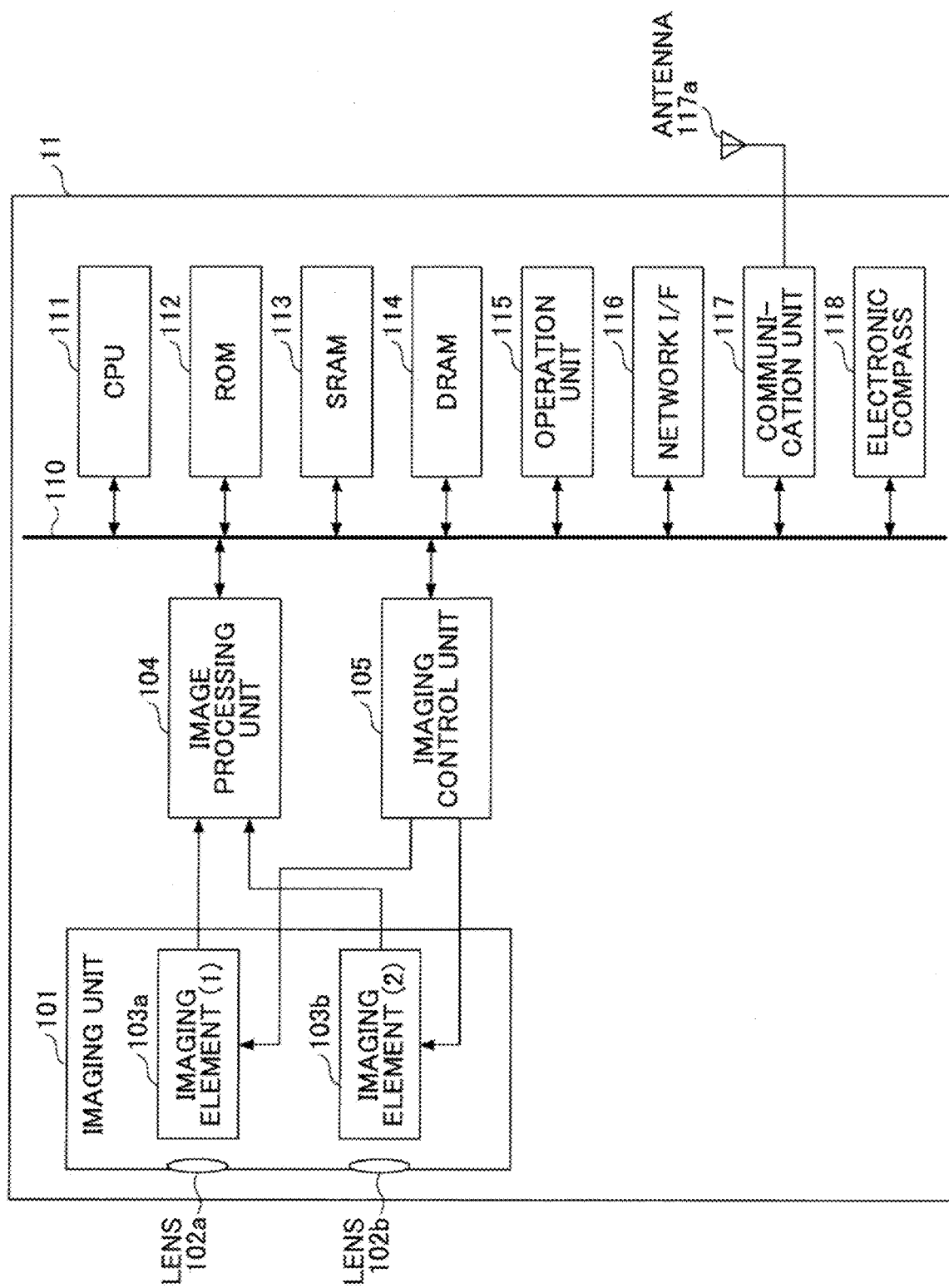
FIG. 6 is a hardware configuration diagram of an imaging device.

FIG. 6 is a hardware configuration diagram of the imaging device 11. The imaging device 11 is an omnidirectional imaging device on which two imaging elements are installed. However, a number of the imaging elements may be three or more. The imaging device 11 includes an image unit 101, an image processing unit 104, an imaging control unit 105, a Central Processing Unit (CPU) 111, a Read Only Memory (ROM) 112, a Static Random Access Memory (SRAM) 113, a Dynamic Random Access Memory (DRAM) 114, the operation unit 115, a network I/F 116, a communication unit 117, an antenna 117a, and an electronic compass 118.

The image unit 101 includes wide-angle lenses (so called "fish-eye lenses") 102a and 102b each having an angle of view of 180° ox more in order to image a hemispheric image, and the two imaging elements 103a and 103b disposed for the wide-angle lenses. The imaging elements 103a and 103b include an image sensor, a timing creation circuit, a register group, and the like. The image sensor may be a Complementary Metal Oxide Semiconductor (CMOS) sensor or a Charge Coupled Device (CCD) sensor that converts an optical image imaged by the fish-eye lens into image data of an electric signal. The timing creation circuit creates a horizontal or vertical synchronizing signal and a pixel clock of the image sensor. In the register group, various commands, parameters, and the like necessary for an operation of the imaging element are set.

The imaging elements 103a and 103b are each connected to the image processing unit 104 via a parallel I/F bus. The imaging elements 103a and 103b are connected to the imaging control unit 105 via a serial I/F bus (such as an I2C bus). The image processing unit 104 and the imaging control unit 105 are connected to the CPU 111 and the like via a bus 110.

Figure 10A:
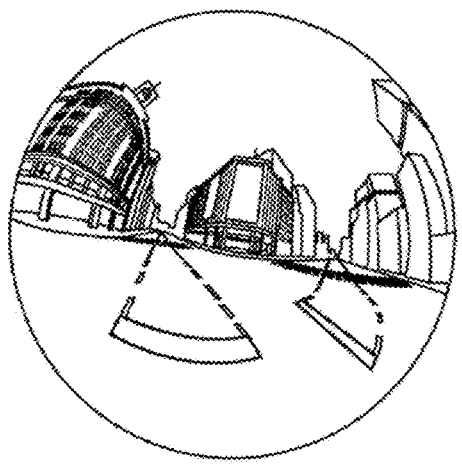
FIG. 10A is a diagram illustrating an image taken by an imaging device.
Figure 10B:
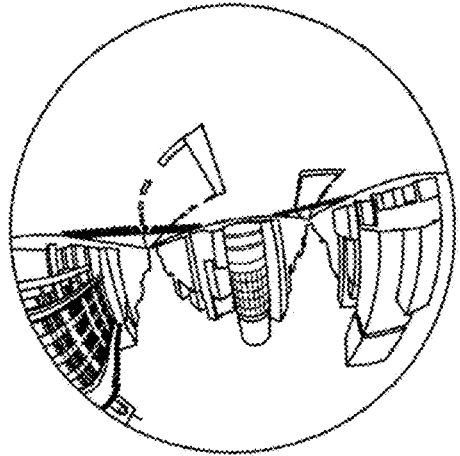
FIG. 10B is a diagram illustrating an image taken by an imaging device.
Figure 10C:
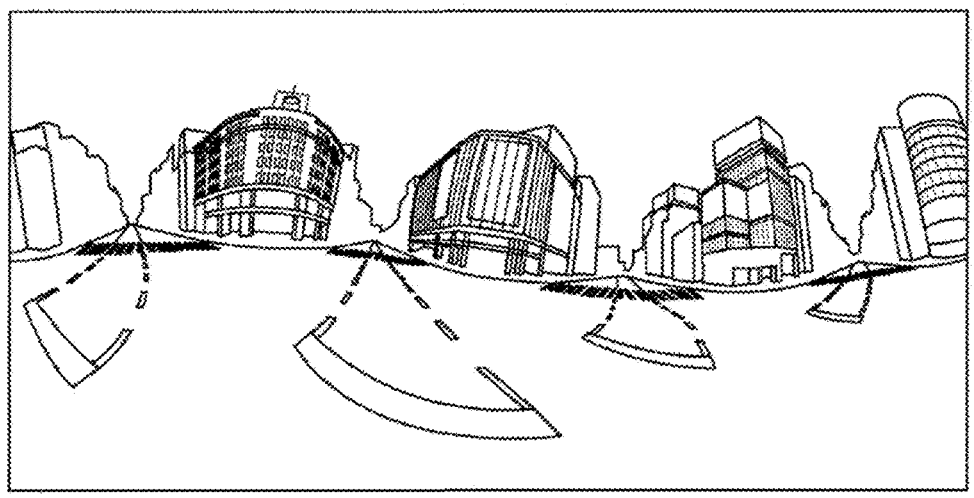
FIG. 10C is a diagram illustrating an image taken by an imaging device.

The image processing unit 104 receives sets of image data output from the imaging elements 103a and 103b via the parallel I/F bus, performs a predetermined process on each set of image data, and combines the sets of image data to generate image data about a Mercator image as shown in FIG. 10C.

The imaging control unit 105 sets commands in the register group of the imaging elements 103a and 103b using the I2C bus. The imaging control unit 105 receives necessary commands and the like front the CPU 111. Further, the imaging control unit 105 uses the I2C bus to receive status data about the register group of the imaging elements 103a and 103b and sends the status data to the CPU 111.

The imaging control unit 105 instructs the imaging elements 103a and 103b to output image data at a time when the shutter button of the operation unit 115 is pressed. The imaging device 11 may have a preview display function or a function for movie display in a display unit. In this case, the output of image data from the imaging elements 103a and 103b is continuously performed at a predetermined frame rate (frame/minute).

Further, the imaging control unit 105 also functions as a synchronization control unit that synchronizes output timing of the image data from the imaging elements 103a and 103b in cooperation with the CPU 111. In addition, while the display unit is not disposed on the imaging device 11 in the present embodiment, the display unit may be disposed.

The CPU 111 controls an entire operation of the imaging device 11 and performs a necessary process. The ROM 112 stores various programs for the CPU 111. The SRAM 113 and the DRAM 114 are working memories and store a program to be executed by the CPU 111 and data being processed, for example. The DRAM 114 stores image data being processed by the image processing unit 104 and image data about a processed Mercator image.

The operation unit 115 is a generic term for various operation buttons, a power supply switch, the shutter button, and a touch panel that serves both as display and operation functions. The photographer 8 operates the operation buttons to input various imaging modes and imaging conditions.

The network I/F 116 is an interface to connect to the network 18 via an Ethernet (registered trademark) card, for example. Further, the network I/F 116 may also be used as an interface for an external recording medium such as a USB memory or an SD card. Data about a Mercator image stored in the DRAM 114 may be stored in the recording medium from the network I/F 116.

The communication unit 117 is a network interface to connect to the network 18 via the antenna 117a. Examples of the communication unit 117 include a communication device for a wireless LAN, a communication chip for BlueTooth (registered trademark), and Near Field Communication (NFC). However, the communication unit 117 is not limited to these examples. In the present embodiment, data about a Mercator image stored in the DRAM 114 is transmitted to the mobile certains 17 via the communication unit 117.

The electronic compass 118 calculates a direction and an inclination (Roll angle of rotation) of the imaging device 11 from terrestrial magnetism, and outputs direction and inclination information. This direction and inclination information is attached to an image in accordance with a metadata format called Exif. The direction and inclination information is used for image processing such as image correction. In addition, the Exif includes an imaging date and time, a thumbnail of image data, a data volume of the image data, and the like.

<Hardware Configuration of Mobile Terminal 17>

Figure 7:
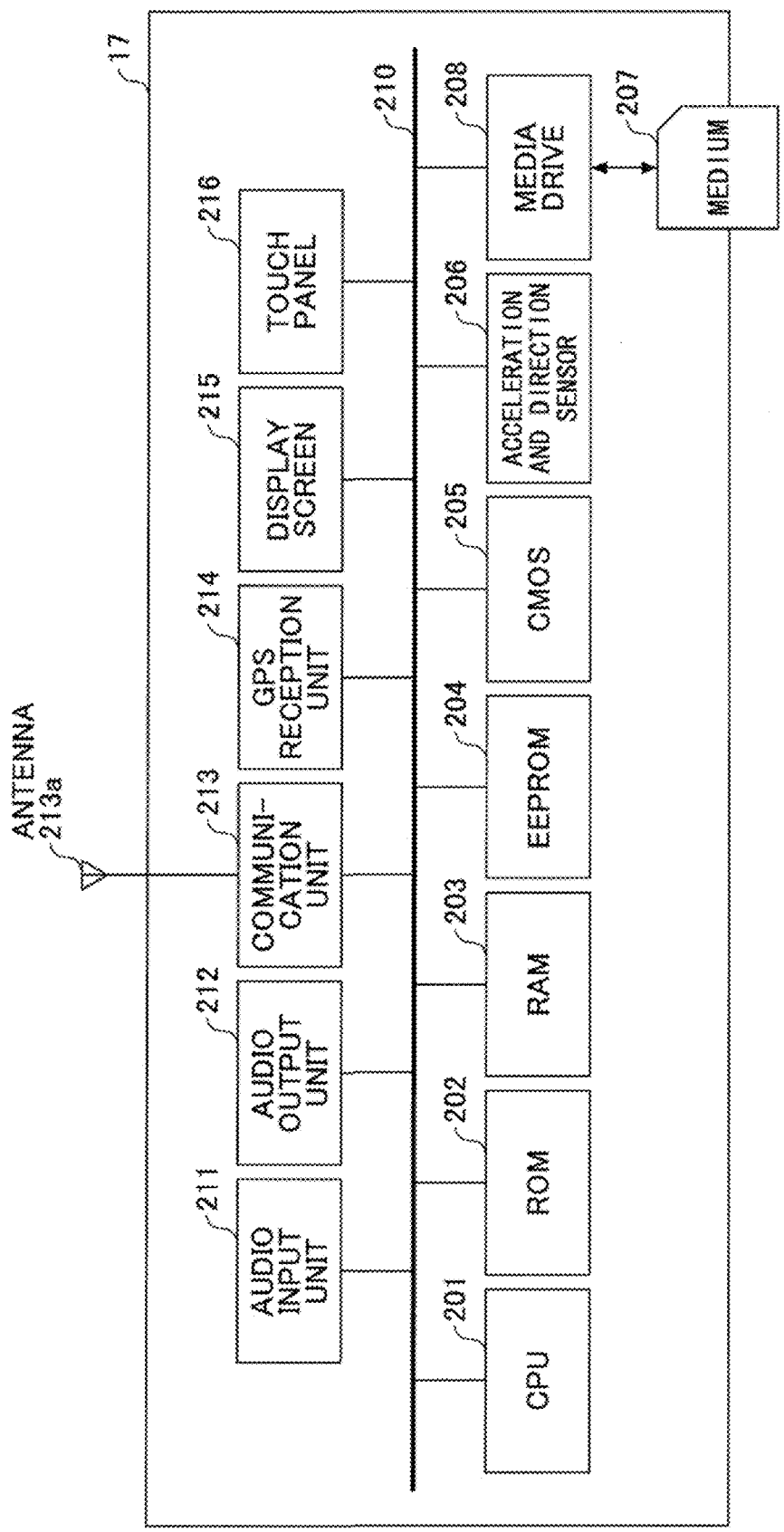
FIG. 7 is a hardware configuration diagram of a mobile terminal.

FIG. 7 is a hardware configuration diagram of the mobile terminal 17. The mobile terminal 17 includes a CPU 201 that controls an entire operation of the mobile terminal 17, a ROM 202 that stores a basic input/output program, a RAM 203 used as a work area for the CPU 201, an Electrically Erasable and Programmable ROM (EEPROM) 204, a CMOS sensor 205 as an imaging element that takes an image of an object and obtains image data in accordance with control of the CPU 201, an acceleration and direction sensor 206 having a function of an electromagnetic compass that detects terrestrial magnetism and a function of a gyro sensor and an acceleration sensor, and a media drive 208 that controls data reading or writing (storing) from or into a recording medium 207 such as a flash memory. The recording medium 207 in which data already stored will be read out and or data will be newly written and stored can be attached to or removed from the mobile terminal 17 in accordance with control of the media drive 208.

In addition, the EEPROM 204 stores an Operating System (OS) to be executed by the CPU 201, and other programs and various data. Further, a CCD sensor may be used instead of the CMOS sensor 205, The mobile terminal 17 includes an audio input unit 211 that converts audio into an audio signal, an audio output unit 212 that converts an audio signal into audio, an antenna 213a, a communication unit 213 that uses the antenna 213a to communicate with a nearest access point 9 via a radio communication signal, a GPS reception unit 214 that receives a GPS signal, including positional information (latitude, longitude, and altitude) about the imaging device 11 by Global Positioning Systems (GPS) satellites or Indoor Messaging System (IMES) as indoor GPS, a display screen 215 such as a liquid crystal display or an organic EL display that displays an image of an object and various types of icons, a touch panel 216 that is disposed on the display screen 215 in an integrated manner and, the touch panel 216 detecting a touch location on the display screen 215 in response to a touch by the finger, a touch pen, or the like, and a bus line 210 such as an address bus or a data bus which electrically connects each of the above-mentioned elements.

In addition, the audio input unit 211 includes a microphone that inputs audio and the audio output unit 212 includes a loud speaker that outputs audio. In accordance with this, it is possible to obtain audio data upon taking an image.

<Hardware Configurations of Content Creation Server 12, Content Providing Server 13, Web Server 14, Content-Using Company's PC 15, and User's PC 16>

Figure 8:
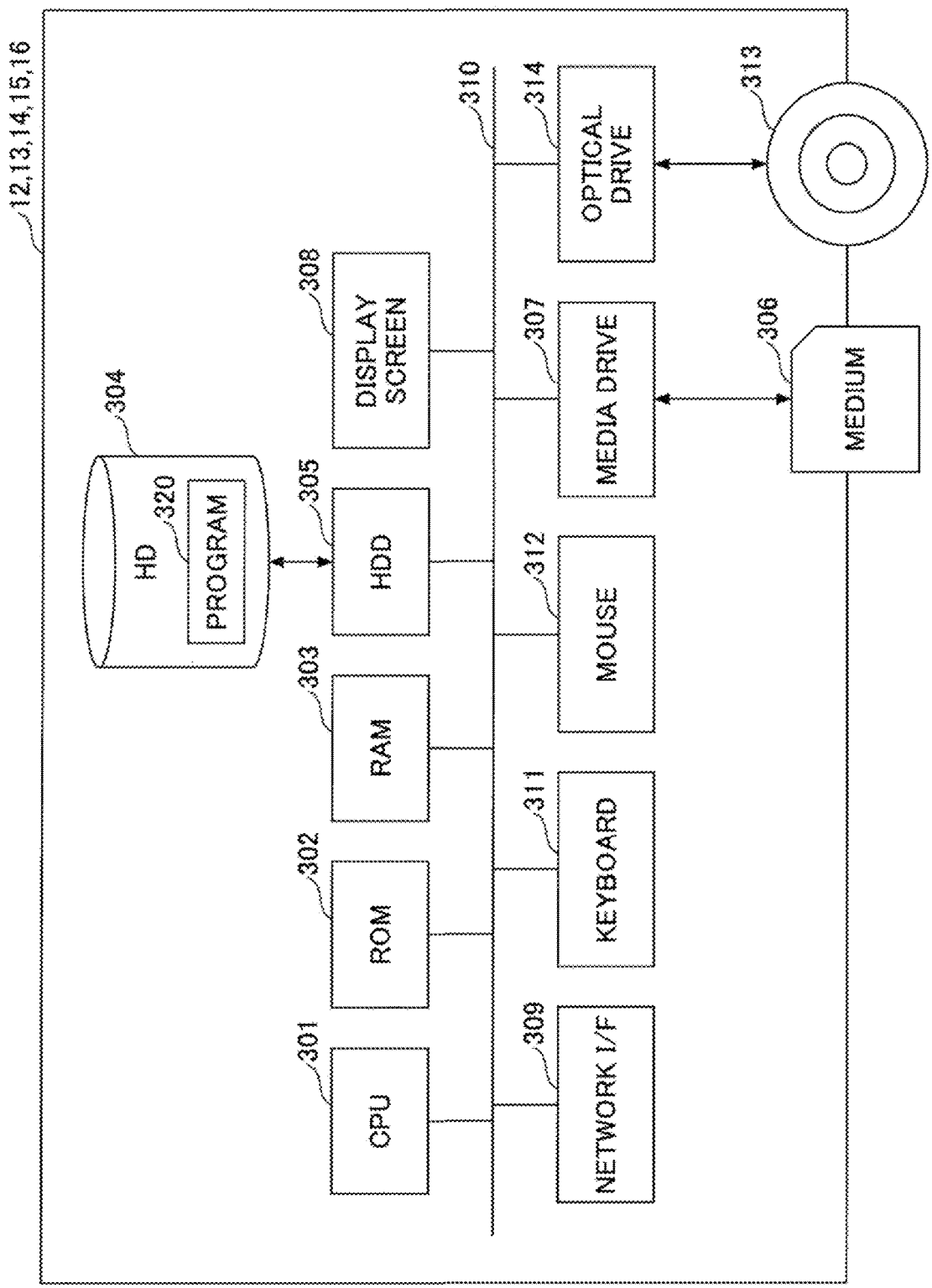
FIG. 8 is a hardware configuration diagram of a content creation server.

FIG. 8 is a hardware configuration diagram of the content creation server 12. In addition, the hardware configuration, of the content creation server 12 shown in FIG. 8 does not need to be housed in a single case or disposed as an integrated device. FIG. 8 shows elements preferably included in the content creation server 12 in terms of hardware.

The content creation server 12 includes a CPU 301, a ROM 302, a RAM 303, a Hard Bisk Drive (HDD) 305, a display screen 308, a network I/F 309, a keyboard 311, a mouse 312, a media drive 307, and an optical drive 314, being connected to a bus 310. The CPU 301 executes a program 320 stored in an HD 304 to control an entire operation of the content creation server 12. The ROM 302 stores a program such as an IPL used to drive the CPU 301. The RAM 303 is used as a work area for the CPU 301. The HD 304 is a storage device on which a non-volatile memory is installed. The HD 304 stores the program 320 to create content, an OS, and the like.

The HDD 305 controls reading or writing of various types of data from or into the HD 304 in accordance with control of the CPU 301. The display screen 308 displays various types of information such as a cursor, menus, a window, characters, and an image. The network I/F 309 is an interface for the network 18 such as a LAN or the Internet.

The keyboard 311 and the mouse 312 are input and output devices. The keyboard 311 has a plurality of keys for inputting characters, numerical values, and various types of instructions and receives an input from the keys. The mouse 312 receives a movement of a mouse pointer, a selection and execution of various types of instructions, and a selection of an object to be processed.

The media drive 30 controls data reading or writing (storing) from or into a medium 306 such as a flash memory. The optical drive 314 controls reading or writing of various types of data from or into a Compact Disc (CD) 313 serving as a removable recording medium, for example.

In addition, the program 320 may be stored distributed in a file of an installable format or in a file of an executable format in a computer-readable recording medium such as the medium 306 or the CD 313. Or the program 320 may be delivered in a form downloaded from a given server-type information processing apparatus.

Since the hardware configuration of the content providing server 13 may be the same as the hardware configuration of the content creation server 12, illustration is omitted. However, in the case of the content, providing server 13, the HD 304 stores the program 320 to provide content. Further, since the hardware configuration of the Web server 14 may be the same as the hardware configuration of the content creation server 12, illustration is omitted. However, in the case of the Web server 14, the HD 304 stores the program 320 to provide a Web page and a Web application and the Web page (Web application). Further, since the hardware configuration of the content-using company's PC 15 may be the same as the hardware configuration of the content creation server 12, illustration is omitted. However, in the case of the content-using company's PC 15, the HD 304 stores the program 320 to edit HTML data. Further, since the hardware configuration of the user's PC 16 may be the same as the hardware configuration of the content creation server 12, illustration is omitted. However, in the case of the user's PC 16, the HD 304 stores browser software capable of browsing a Web page and content, for example, as the program 320.

<Example of Imaging by Imaging Device 11>

Figure 9:
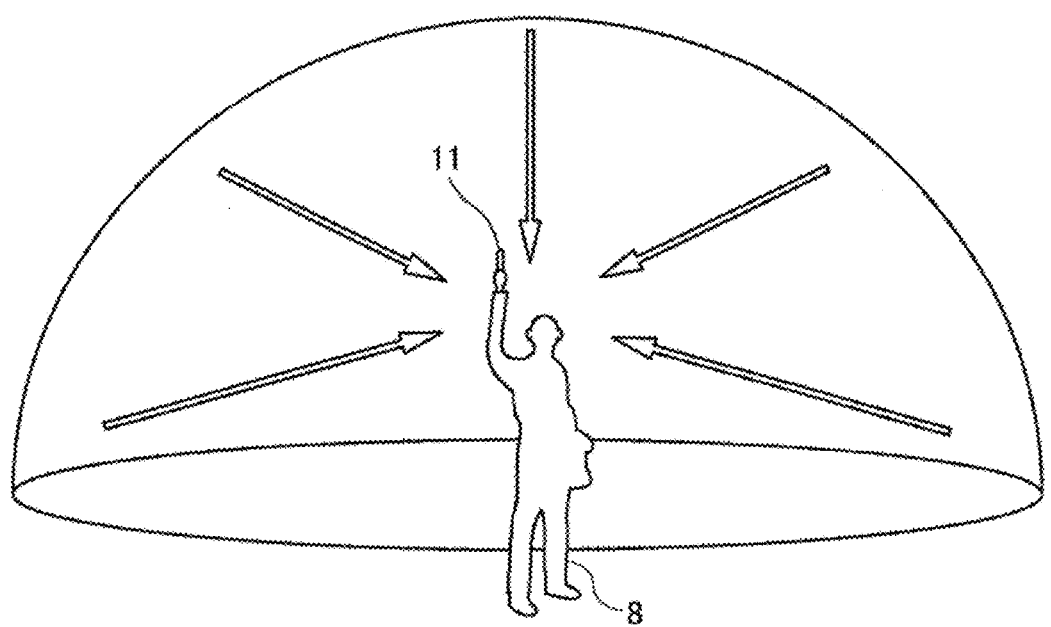
FIG. 9 is a diagram schematically showing an imaging range of an imaging device.

In the following, a range to be imaged by the imaging device 11 and an image are described with reference to FIGS. 9 and 10A to 10D. FIG. 9 is a diagram schematically showing an imaging range of the imaging device 11. The imaging device 11 takes an image of omnidirectional surroundings, so that the imaging device 11 may take an image of the photographer 8. Accordingly, if the photographer 8 does not wish to be taken in an image, the photographer 8 holds the imaging device 11 on one hand and stretches the arm upon taking an image. In addition, since the imaging device 11 has a screw hole to be installed on a tripod, a stick may be inserted into the screw hole and the photographer 8 may grasp the stick, such that the imaging device 11 lifted to a higher location takes an image.

In this manner, each of the imaging elements 103a and 103b takes an image of objects around the photographer 8, so that two hemispheric images are obtained.

FIG. 10A is a diagram illustrating a hemispheric image (front side) taken by the imaging device 11. FIG. 10B is a diagram illustrating a hemispheric image (back side) taken by the imaging device 11. FIG. 10C is a diagram illustrating an image (hereafter "Mercator image") rendered in the Mercator projection.

As shown in FIG. 10A, an image taken by the imaging element 103a is a hemispheric image (front side) warped due to the fish-eye lens 102a. Further, as shown in FIG. 10B, an image taken fey the imaging element 103b is a hemispheric image (back side) warped due to the fish-eye lens 102b. The imaging device 11 combines the hemispheric image (front side) with the hemispheric image (back side) inverted by 180 degrees and creates the Mercator image shown in FIG. 10C. From this Mercator image, a spherical image is generated.

Figure 10D:
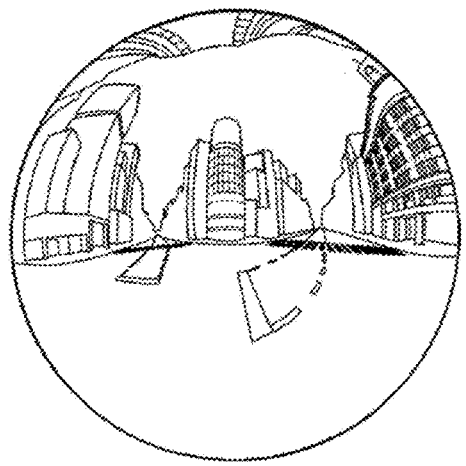
FIG. 10D is a diagram illustrating an image taken by an imaging device.

FIG. 10D is a diagram schematically showing the spherical image. For example, the spherical image is generated when the Mercator image shown in FIG. 10C is applied to a sphere. The spherical image is a 360-degree view in which objects are captured from a certain point in all directions vertically and horizontally. It is possible to generate the spherical image to be a still image or a movie. Since the imaging device 11 according to the present embodiment can generate a spherical image in a single imaging, a conventional process in which one takes a plurality of images while changing an imaging range at the same location and combines the images is not necessary. In the following, a spherical image is simply referred to as an image unless specifically distinguished.

<Functions of Web Service System 100>

Figure 11:
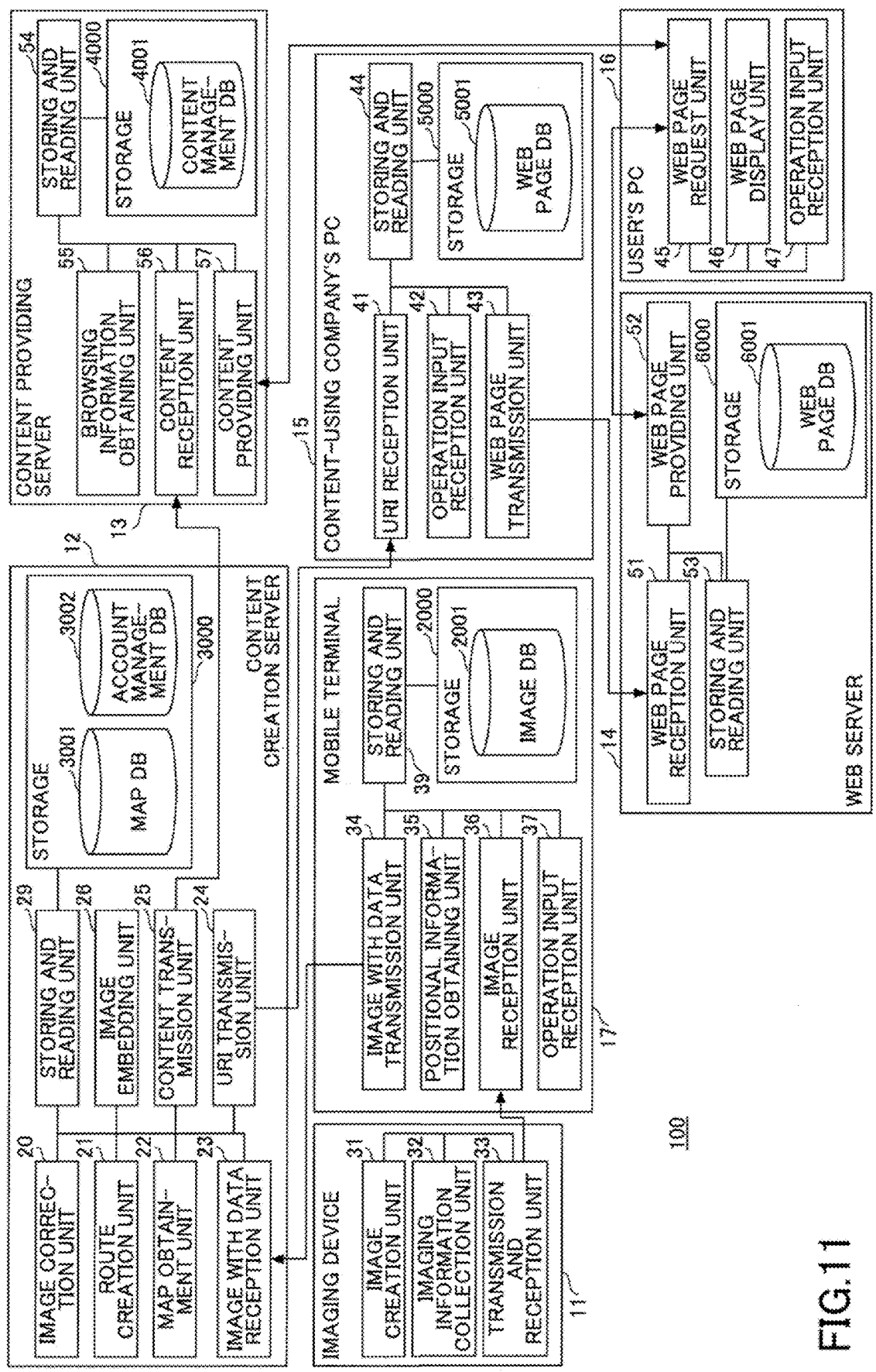
FIG. 11 is a functional block diagram of a web service system.

FIG. 11 is a functional block diagram of the Web service system 100. In the following, functions of the devices (the imaging device 11, the mobile terminal 17, the content creation server 12, the content providing server 13, the Web server 14, the content-using company's PC 15, the user's PC 16) included in the Web service system 100 will be described.

The imaging device 11 includes an image creation unit 31, an imaging information collection unit 32, and a transmission and reception unit 33. Each of the units (the image creation unit 31, the imaging information collection unit 32 and the transmission and reception unit 33) included in the imaging device 11 is a function implemented or a unit caused to function when any one of constituent elements shown in FIG. 6 operates in response to an instruction from the CPU 111 in accordance with a program loaded from the ROM 112 to the SRAM 113 or the DRAM 114.

The image creation unit 31 is implemented by an instruction from the CPU 111, the image unit 101, the image processing unit 104, and the imaging control unit 105 shown in FIG. 6. The image creation unit 31 takes an image of surrounding's and converts a Mercator image into a spherical image. The image creation unit 31 generates the image at regular intervals or at each fixed distance in accordance with settings made by the photographer 8. Further, the image creation unit 31 generates an image at a time when the photographer 8 presses the shutter button of the operation unit 115.

The imaging information collection unit 32 is implemented by an instruction from the CPU 111 and the electronic compass 118 shown in FIG. 6, for example. The imaging information collection unit 32 collects imaging information upon taking an image. The imaging information includes the following. "Imaging date and time, a thumbnail of image data, direction, a roll angle, and a data size"

This imaging information is attached to an image in a file format called Exif, for example. In addition, the direction is information that indicates north, south, east and west in the image. In addition, the roll angle may be corrected to be zero when an image is taken. In this case, the roll angle may not be included in the imaging information.

The transmission and reception unit 33 is implemented by an instruction from the CPU 111 and the communication unit 11 shown in FIG. 6, for example. The transmission and reception unit 33 transmits an image to the mobile terminal 17. The transmission and reception unit 33 preferably transmits the image to the mobile terminal 17 in each imaging. In accordance with this, the mobile terminal 17 can detect an imaging location at a time that is not greatly different from a time when the image is taken. In addition, if the imaging device 11 has a function of detecting the imaging location, the transmission and reception unit 33 does not need to transmit the image in each imaging.

<Mobile Terminal 17>

In the following, functions of the mobile terminal 17 are described. The mobile terminal 17 includes an image with data transmission unit 34, a positional information obtaining unit 35, an image reception unit 36, an operation input reception unit 37, and a storing and reading unit 3S. Each of the units (the image with data transmission unit 34, the positional information obtaining unit 35, the image reception unit 36, the operation input reception unit 37, and the storing and reading unit 39) included in the mobile terminal 17 is a function implemented or a unit caused to function when any one of constituent elements shown in FIG. 7 operates in response to an instruction from the CPU 201 in accordance with a program loaded from the EEPROM 204 to the RAM 203.

Further, the mobile terminal 17 also includes a storage 2000 constructed with the RAM 203 or the EEPROM 204 shown in FIG. 7. An image DB 2001 is constructed in the storage 2000. The image DB 2001 stores a series of images taken by the imaging device 11 on a route. The series of images refers to any image taken on the route. Not all of the images may be included. For example, a given function or unit in the imaging device 11 or the mobile terminal 17 evaluates picture quality and selects only those images that meet a standard.

The operation input reception unit 37 is implemented by an instruction from the CPU 201 and the touch panel 216 shown in FIG. 7, for example. The operation input reception unit 37 receives various types of operations for the mobile terminal 17 of the photographer 8. For example, the operation input reception unit 37 receives a start of taking images, an end of taking images, imaging intervals (a cycle or a fixed distance), and the like. Such operational contents are transmitted from the mobile terminal 17 to the imaging device 11.

The image reception, unit 36 is implemented by an instruction from the CPU 201 and the communication unit 213 shown in FIG. 7, for example. The image reception unit 3S receives an image from the imaging device 11. Images transmitted from the start of taking images to the end of taking images are stored in the image DB 2001.

The positional information obtaining unit 35 is implemented by an instruction from the CPU 201 and the GPS reception unit 214 shown in FIG. 7, for example. The positional information obtaining unit 35 obtains a current location of the mobile terminal 17 each time the image reception unit 36 receives an image. This current location is an imaging location. The positional information obtaining unit 35 adds the imaging location to metadata about the image. Accordingly, "an imaging date and time, a thumbnail of image data, a direction, a roll angle, a data size, and the imaging location" are attached to the image. However, in the following description, for ease of description, it is assumed that the thumbnail of the image data, the roll angle, and the data size are omitted and the following imaging information is attached to the image.

Imaging information: "imaging date and time, direction, and the imaging location"

The image with data transmission unit 34 is implemented by an instruction from the CPU 201 and the communication unit 213 shown in FIG. 7, for example. The image with data transmission unit 34 transmits an image to which imaging information is attached to the content creation server 12. The transmission is performed when the operation input reception unit 37 receives an end of taking images, for example. However, the transmission may be performed in each imaging or after the end of taking images. Further, the photographer 8 may store the image in the recording medium 207 and cause the content creation server 12 to read the image.

The storing and reading unit 39 is implemented by an instruction from the CPU 201 shown in FIG. 7, for example. The storing and reading unit 39 stores and reads data in and from the storage 2000. In addition, the storing and reading of data in and from the storage 2000 by the storing and reading unit 39 is assumed to be performed by the storing and reading unit 39 in response to a request from each unit and may not be specifically described.

<Content Creation Server 12>

In the following, functions of the content creation server 12 are described. The content creation, server 12 includes an image correction unit 20, a route creation unit 21, a map obtainment unit 22, an image with data reception unit 23, a URI transmission unit 24, a content transmission unit 25, an image embedding unit 26, and a storing and reading unit 29. Each of the units (the image correction unit 20, the route creation unit 21, the map obtainment unit 22, the image with data reception unit 23, the URI transmission unit 24, the content transmission unit 25, the image embedding unit 26, and the storing and reading unit 29) included in the content creation server 12 is a function implemented or a unit caused to function when any one of constituent elements shown in FIG. 8 operates in response to an instruction from the CPU 301 in accordance with the program 320 loaded from the HDD 305 to the RAM 303.

Further, the content creation server 12 also includes a storage 3000 constructed with the RAM 303 or the HDD 305 shown in FIG. 8. A map DB 3001 and an account management DB 3002 are constructed in the storage 3000.

The map DB 3001 stores data to draw the map 62 and data that represents a structure of roads where walkers can walk. Since the data to draw the map 62 contains many display objects including boundaries such as prefectures, green space, rivers, roads, railroads, symbols, and notes, the data is classified into groups of similar properties, so that and each group can be separately drawn. An image where display objects classified into each group or display objects are drawn is called a layer. A map is drawn when several layers are superposed. Map data in each layer is either vector data or raster data described in a format suitable for the display objects. Further, in the map data, longitude and latitude are sectioned into meshes and one or more meshes are coupled to create the map 62. In the case of the vector data, points, polylines, and polygons are positioned based on longitude and latitude. In the case of the raster data, data is prepared in association with longitude and latitude depending on a scale.

The data that represents the structure of roads has a node table and a link table. In the node table, nodal points when road networks are represented are registered in association with longitude and latitude. The nodal points are called nodes. Examples of nodes include intersections, junctions, confluences, and curves. In the link table, roads where walkers can walk (sidewalks, crosswalks, pedestrian bridges, underpasses, roads where walkers can pass through) are registered in association with a node number of a node. Not only the roads where walkers can walk but also roads where cars can run may also be registered. Further, in the link table, a link type, a width, a link length, and the like are registered. A road between two nodes is called a link. The link can be a line segment that connects nodes.

TABLE 1

| IDs of content - using companies | Passwords | Mail addresses |
|---|---|---|
| 001 | 1111 | 001@mailad.co.jp |
| 002 | 2222 | 002@mailad.co.jp |
| 003 | 3333 | 003@mailad.co.jp |
| 004 | 4444 | 004@mailad.co.jp |

In the account management DB 3002, an account table for content-using companies is registered as shown in Table 1. In the account table, IDs of the content-using companies, passwords, and mail addresses are registered, for example. The IDs of the content-using companies are unique identification information to identify the content-using companies. The passwords are used when the content creation server 12 authenticates the content-using companies. The rail addresses are mail addresses of persons 7 in charge in the content-using companies and are destinations when a URI of content is transmitted. In addition, instead of the mail addresses or in addition to the mail addresses, FAX numbers or phone numbers may be registered.

The image with data reception unit 23 is implemented by an instruction from the CPU 301 and the network I/F 309 shown in FIG. 8, for example. The image with data reception unit 23 receives an image to which imaging information is attached from the mobile terminal 17.

The image correction unit 20 is implemented by an instruction from the CPU 301 shown in FIG. 8, for example. The image correction unit 20 compresses an image to which imaging information is attached and performs horizontal correction based on a roll angle. In addition, the process of the image correction unit 20 may be performed by the mobile terminal 17.

The map obtainment unit 22 is implemented by an instruction from the CPU 301 shown in FIG. 8, for example. The map obtainment unit 22 obtains a map 62 from the map DB 3001. An area to be obtained as the map 62 is determined such that all imaging locations included in imaging information are included in the area.

The route creation unit 21 is implemented by an instruction from the CPU 301 shown in FIG. 8, for example. The route creation unit 21 creates a route 63 on the map 62 obtained by the map obtainment unit 22. The route creation unit 21 maps the imaging locations included in the imaging information to roads where walkers can walk. Even if the imaging locations are somewhat away from the roads, map matching is performed such that the imaging locations are arranged on nearest roads. By connecting the arranged imaging locations successively from ones with older imaging date and times, it is possible to obtain the route 63. Or the arranged imaging locations may be connected successively from those imaging locations that are close to each another. Even if the photographer 8 walks to and fro on the route, it is possible to obtain content along the route.

The image embedding unit 26 embeds images in imaging locations arranged when the route 63 is created. Embedding refers to associating imaging locations with images on a map. In accordance with the association, when an end user 6 specifies an imaging location on the map, an image taken at the imaging location is displayed. The image embedding unit 26 is an example of an image association unit.

Content refers to data in which the route 63 is created on the map and images are embedded in imaging locations. As shown in FIG. 3, the content has an image 61 and a still image that can be displayed on the map 62 as many as the number of the images 61. When the end user 6 selects an imaging location on the map 62, information about the imaging location is sent to the content providing server 13. The content providing server 13 transmits an image of the selected location to the user's PC 16. Further, a plurality of still images may be converted into a movie file such as MPEG.

The content transmission unit 25 is implemented by an instruction from the CPU 301 and the network I/F 309 shown in FIG. 8, for example. The content transmission unit 25 specifies a URI where content is registered and transmits the URI to the content providing server 13. The URI where the content is registered is assumed to be determined based on certain rules, for example.

"Domain name+directory name+ID of content-using company+content name"

The domain name is known because it is a domain of the content providing server 13. The directory name is a known folder name (such as "4000" for a storage 4000). The content name may be provided by the photographer 8 before transmission of an image or may be provided by the content creation server 12. Accordingly, a URI may be "content providing server/4000/ID of content-using company/content name," for example.

The URI transmission unit 24 is implemented by an instruction from the CPU 301 and the network I/F 309 shown in FIG. 8, for example. The URI transmission unit 24 transmits the URI of the content to a mail address in the account management DB 3002.

The storing and reading unit 29 is implemented by an instruction from the CPU 301 shown in FIG. 8, for example. The storing and reading unit 29 stores and reads data in and from the storage 3000.

<Content Providing Server 13>

In the following, functions of the content providing server 13 are described. The content providing server 13 includes a browsing information obtaining unit 55, a content reception unit 56, a content providing unit 57, and a storing and reading unit 54. Each of the units (the browsing information obtaining unit 55, the content reception unit 56, the content providing unit 57, and the storing and reading unit 54) included in the content providing server 13 is a function implemented or a unit caused to function when any one of constituent elements shown in FIG. 8 operates in response to an instruction from the CPU 301 in accordance with the program 320 loaded from the HDD 305 to the RAM 303.

The content providing server 13 also includes the storage 4000 constructed with the RAM 303 or the HDD 305 shown in FIG. 8. A content management DB 4001 is constructed in the storage 4000.

indicates a staying time in the content providing server 13 and a number of people is registered in each of time periods divided into 5-10 minute intervals. In addition, it is possible to measure the staying time in the content providing server 13 from a period of time when a TCP session is maintained, for example. The time periods indicate in which time period content is browsed and a number of people registered in each of the time periods divided into one hour intervals like 0-1 o'clock and 1-2 o'clock, for example.

The content reception unit 56 is implemented by an instruction from the CPU 301 and the network I/F 309 shown in FIG. 8, for example. From the content creation server 12, the content reception unit 56 receives content whose URI is specified. The content reception unit 56 registers the contents with the content management DB 4001 based on the URI obtained from the content creation server 12 and causes the content management DB 4001 to store the content. Since the URI of the content is created using the ID of the content-using company and the content name, it is possible to register the ID of the content-using company and the content name with the content management DB 4001. Or the content reception unit 56 may obtain the ID of the content-using company and the content name from the content creation server 12 to create the URI and register the URI of the content with the content management DB 4001, for example.

The content providing unit 57 is implemented by an instruction from the CPU 301 shown in FIG. 8, for example. The content providing unit 57 provides the user's PC 16 with content whose URI is specified.

The browsing information obtaining unit 55 is implemented by an instruction from, the CPU 301 shown in FIG. 8, for example. The browsing information obtaining unit 55 counts a number of provisions of content by the content providing unit 57 and registers the number of provisions of content with the account management DB 3002. Further, the browsing information obtaining unit 55 also registers "how

TABLE 2

| IDs of content-using companies | Content names | URIs | Numbers of provision |
|---|---|---|---|
| 001 | 001-A | _/4000/001/001-A | N001A |
| 001 | 001-B | _/4000/001/001-B | N001B |
| 002 | 002-A | _/4000/002/002-A | N002A |
| 003 | 003-A | _/4000/003/003-A | N003A |

| Browsing time | | | | | Time periods | | | | | |
|---|---|---|---|---|---|---|---|---|---|---|
| Less than 5 (min.) | 5-10 | 10-20 | — 50-60 | More than 1 (hr.) | 0-1 (o' clock) | 1-2 | 2-3 | — | 22-23 | 23-0 |
| a (number of people) | b | c | d | e | aa | bb | cc | | dd | ee |

The content management DB 4001 stores a content management table as shown in Table 2. In the content management table, IDs of content-using companies, content names, URIs, numbers of provisions, a browsing time, and time periods are registered, for example. In addition, for ease of description, it is assumed that content is stored in the content management DB 4001. However, the content may be stored at a location accessible via the network 18. If a URI is specified, the content providing server 13 can identify content. The numbers of provisions indicate how many times each content is provided to an end user 6. The browsing time long the content is browsed" by the end user 6 and a "time period when browsing is performed" with the account management DB 3002.

The storing and reading unit 54 is implemented by an instruction from the CPU 301 shown in FIG. 8, for example. The storing and reading unit 54 stores and reads data in and from the storage 4000.

<Content-Using Companys PC 15>

In the following, functions of the content-using company's PC 15 are described. The content-using company's PC 15 includes a URI reception unit 41, an operation input reception unit 42, a Web page transmission unit 43, and a storing and reading unit 44. Each of the units (the URI reception unit 41, the operation input reception unit 42, the Web page transmission unit 43, and the storing and reading unit 44) included in the content-using company's PC 15 is a function implemented or a unit caused to function when any one of constituent elements shown in FIG. 8 operates in response to an instruction from the CPU 301 in accordance with the program 320 loaded from the HDD 305 to the RAM 303.

The content-using company's PC 15 also includes a storage 5000 constructed with the RAM 303 or the HDD 305 shown in FIG. 8. A Web page DB 5031 is constructed in the storage 5000.

The Web page DB 5001 stores Web pages of the content-using company's PC 15. These Web pages are to be registered with the Web server 14 and are the same as Web pages to be provided by the Web server 14.

The URI reception unit 41 is implemented by an instruction from the CPU 301 and the network I/F 309 shown in FIG. 8, for example. The URI reception unit 41 receives a URI from the content creation server 12.

The operation input reception unit 42 is implemented by an instruction from the CPU 301, the keyboard 311, and the mouse 312 shown in FIG. 8, for example. The operation input reception unit 42 receives an operation of the person 7 in charge in the content-using company. This operation is mainly for pasting a URI at a desired location of a company's Web page (including HTML data and a Web application described in JavaScript).

The Web page transmission unit 43 is implemented by an instruction from the CPU 301 and the network I/F 309 shown in FIG. 8, for example. The Web page transmission unit 43 transmits a Web page to the Web server 14 in a protocol such as File Transfer Protocol (FTP), Hypertext Transfer Protocol (HTTP), or Secure Shell (SSH).

The storing and reading unit 44 is implemented by an instruction from the CPU 301 shown in FIG. 8, for example. The storing and reading unit 44 stores and reads data in and from the storage 5000.

In addition, the content-using company's PC 15 may include the map obtainment unit 22, the route creation unit 21, and the image embedding unit 26 of the content creation server 12. In accordance with this, the person in charge in the content-using company can create content.

<Web Server 14>

In the following, functions of the Web server 14 are described. The Web server 14 includes a Web page reception unit 51, a Web page providing unit 52, and a storing and reading unit 53. Each of the units (the Web page reception unit 51, the Web page providing unit 52, and the storing and reading unit 53) included in the Web server 14 is a function implemented or a unit caused to function when any one of constituent elements shown in FIG. 8 operates in response to an instruction from the CPU 301 in accordance with the program 320 loaded from the HDD 305 to the RAM 303.

Further, the Web server 24 also includes a storage 6000 constructed with the RAM 303 or the HDD 305 shown in FIG. 8. A Web page DB 6001 is constructed in the storage 6000.

The Web page DB 6001 stores Web pages to be provided by the Web server 14 in response to a request from the user's PC 16.

The Web page reception unit 51 is implemented by an instruction from the CPU 301 and the network I/F 309 shown in FIG. 8, for example. The Web page reception unit 51 receives a Web page from the content-using company's PC 15. The received Web page is stored in the Web page DB 6001.

The Web page providing unit 52 is implemented by an instruction from the CPU 301 and the network I/F 309 shown in FIG. 8, for example. The Web page providing unit 52 transmits a Web page requested from the user's PC 16 to the user's PC 16.

The storing and reading unit 53 is implemented by an instruction from the CPU 301 shown in FIG. 8, for example. The storing and reading unit 53 stores and reads data in and from the storage 6000.

<User's PC 16>

In the following, functions of the user's PC 16 are described. The user's PC 16 includes a Web page request unit 45, a Web page display unit 46, and an operation input reception unit 47. Each of the units (the Web page request unit 45, the Web page display unit 46, and the operation input reception unit 47) included in the user's PC 16 is a function implemented or a unit caused to function when any one of constituent elements shown in FIG. 8 operates in response to an instruction from the CPU 301 in accordance with the program 320 loaded from the HDD 305 to the RAM 303.

The Web page request unit 45 is implemented by an instruction from the CPU 301 and the network I/F 309 shown in FIG. 8, for example. The Web page request unit 45 sends a request for a Web page to the Web server 14 in response an operation by the end user 6. Further, the Web page request unit 45 sends a request for content to the content providing server 13 if the end user 6 specifies a URI of the content.

The Web page display unit 46 is implemented by an instruction from the CPU 301 and the display screen 308 shown in FIG. 8, for example. The Web page display unit 46 displays a Web page. The Web page request unit 45 and the Web page display unit 46 are implemented by what is called browser software However, the Web page request unit 45 and the Web page display unit 46 are not limited to the browser software.

The operation input reception unit 47 is implemented by an instruction from the CPU 301, the keyboard 311, and the mouse 312 shown in FIG. 8, for example. The operation input reception unit 47 receives an operation of the end user 6. The end user 6 specifies a desired Web page or content included in the Web page. If the content is displayed, the end user 6 specifies an imaging location on a map or a display direction of an image.

In addition, the user's PC 16 may include the map obtainment unit 22, the route creation unit 21, and the image embedding unit 26 of the content creation server 12. In accordance with this, the end user 6 can create content.

<Embedding of URI>

FIGS. 12A to 12C are diagrams illustrating embedding of a URI in a Web page. FIG. 12A shows HTML data and FIG. 12B shows a URI that indicates where content is stored.

In the URI shown in FIG. 12B, a domain name is "YouTube.com." This is an example of a domain name, of the content, providing server 13. "4000/001/001-A" sequentially indicates a directory name, an ID of a content-using company, and a content name.

Iframe tags are a kind of tags for HTML data by which a resource (content in the present embodiment) specified by "src" is displayed in line on a screen. A width of an image to be displayed on the user's PC 16 is specified by "width" and a height of the image to be displayed is specified by "height." In the "src," a domain of the site and the URI are described. A width of a boundary line when an image is displayed is specified by "frameborder." Allowing display in a full screen mode is specified by "allowfullscreen."

In addition, the Iframe tags are an example. Any kind of tags may be used in compliance with a description format of Web pages (description format of HTML in this case). FIG. 12C shows a Web page in which the URI is embedded. Since the person 7 in charge in the content-using company can associate a Web page of his own company with content by merely pasting the URI at a desired place, it is readily possible to start using the content. Further, it is easy to change or add content. In addition, a location where the URI is pasted is an example. Any kind of tags may be used in compliance with a description format of Web pages.

<Transmission of Content when Content is Provided>

When the content providing unit 57 transmits content to the user's PC 16, the content providing unit 57 may transmit at least the map 62 and one or more images at first. It is not necessary to transmit all the images included in the content. Further, when the end user 6 successively specifies imaging locations or replays the content as a movie, the end user 6 does not see the images of omnidirectional surroundings.

Accordingly, the content providing unit 57 transmits only a partial image of the same area as displayed on the user's PC 16 instead of transmitting all portions the image to the user's PC 16. In this manner, the content providing server 13 may transmit only a part of omnidirectional panoramic images that have a relatively large data size, so that a transmission time can be reduced.

Figure 13:
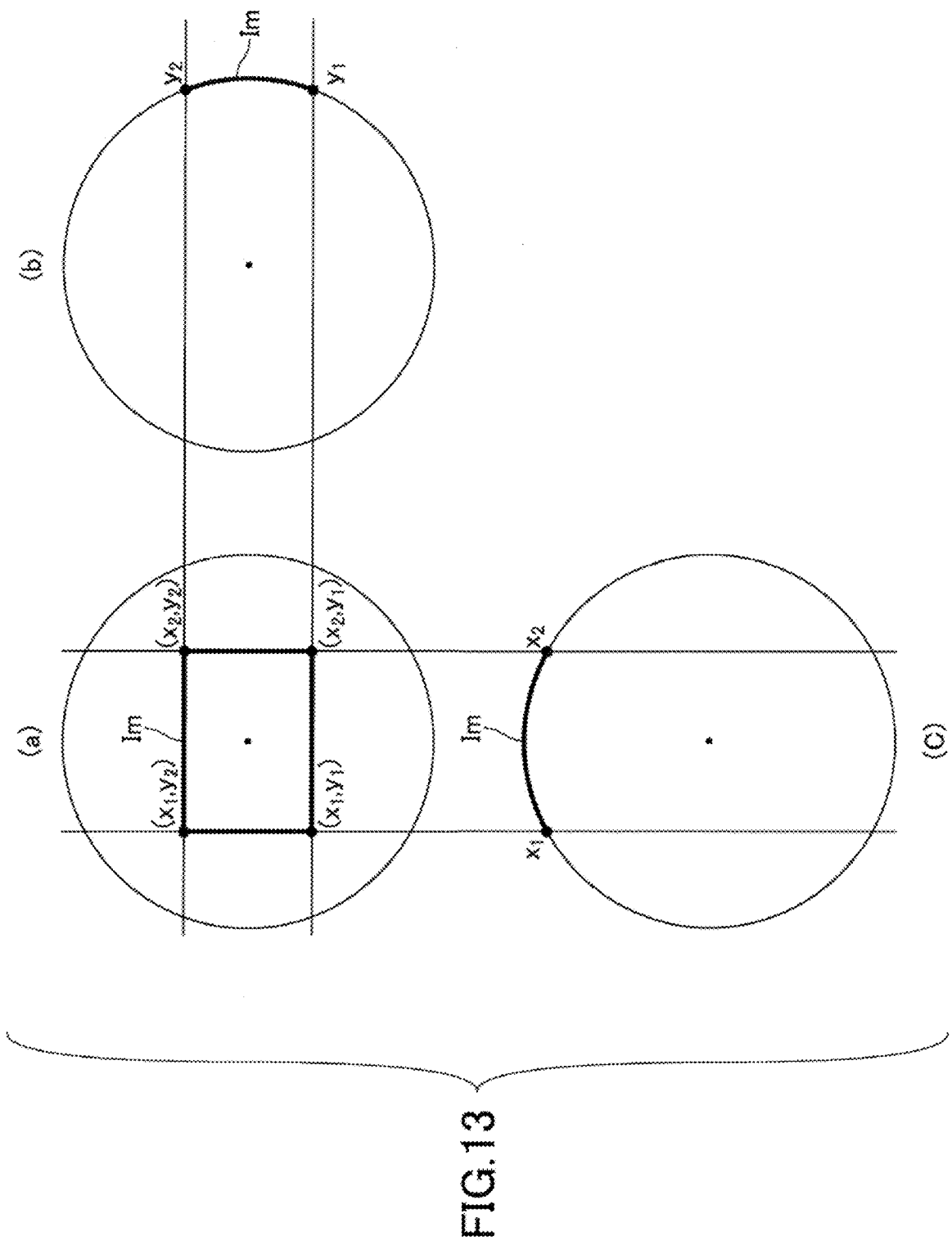
FIG. 13 is a diagram schematically illustrating, transmission of a partial image by a content providing unit.

FIG. 13 is a diagram schematically illustrating the transmission of a partial image by the content providing unit 57. In FIG. 13-(*a*) to 13-(*c*), a location of the partial image is displayed when a spherical image is formed on a three-dimensional sphere. FIG. 13-(*a*) shows a rectangular field of a part of the sphere. FIG. 13-(*b*) shows a projection of the rectangular area in a height direction. FIG. 13-(*c*) shows a projection of the rectangular area in a horizontal direction. A partial image Im is a portion of the spherical image, the partial image Im being displayed on the user's PC 16.

On the spherical image, a pixel of a given point is specified in accordance with coordinates such as longitude and latitude. In FIG. 13-(*a*) to 13-(*c*), longitude and latitude are represented by x and y. Accordingly, the user's PC 16 can specify the partial image Im using four coordinates (x1, y2), (x1, y1), (x2, y1), and (x2, y2) of the partial image Im displayed on the user's PC 16.

The Web page request unit 45 transmits the coordinates of the partial image Im to the content providing server 13. The coordinates of the partial image Im are an example of image range information and specify an area (angle of view) when a part of the spherical image is displayed on the display screen 308. The content providing unit 57 of the content providing server 13 transmits only the partial image defined by the coordinates from an image to be transmitted next to the user's PC 16. The image to be transmitted next is an image in a next imaging location along the route 63 if the end user 6 has browsed a plurality of images. If the end user 6 has browsed only a single image, the image to be transmitted next is a next image arranged in a direction perpendicular (in a direction that the end user 6 sees) to the partial image displayed in the browsed image.

In accordance with this, the content providing server 13 can transmit the image in a short time. In addition, if there is a sufficient communication band (if there is sufficient time until an image in the next imaging location is to be transmitted), the content providing unit 57 preferentially transmits another partial image adjacent to the transmitted partial image to the user's PC 16. Accordingly, if there is a sufficient communication band, it is possible to transmit all portions of a spherical image to the user's PC 16. Further, if the image in the next imaging location is requested from the user's PC 16 before all the portions of spherical image are transmitted to the user's PC 16, only a partial image defined by four coordinates in the next imaging location is transmitted.

<Embedding of Spherical Image>

Figure 14:
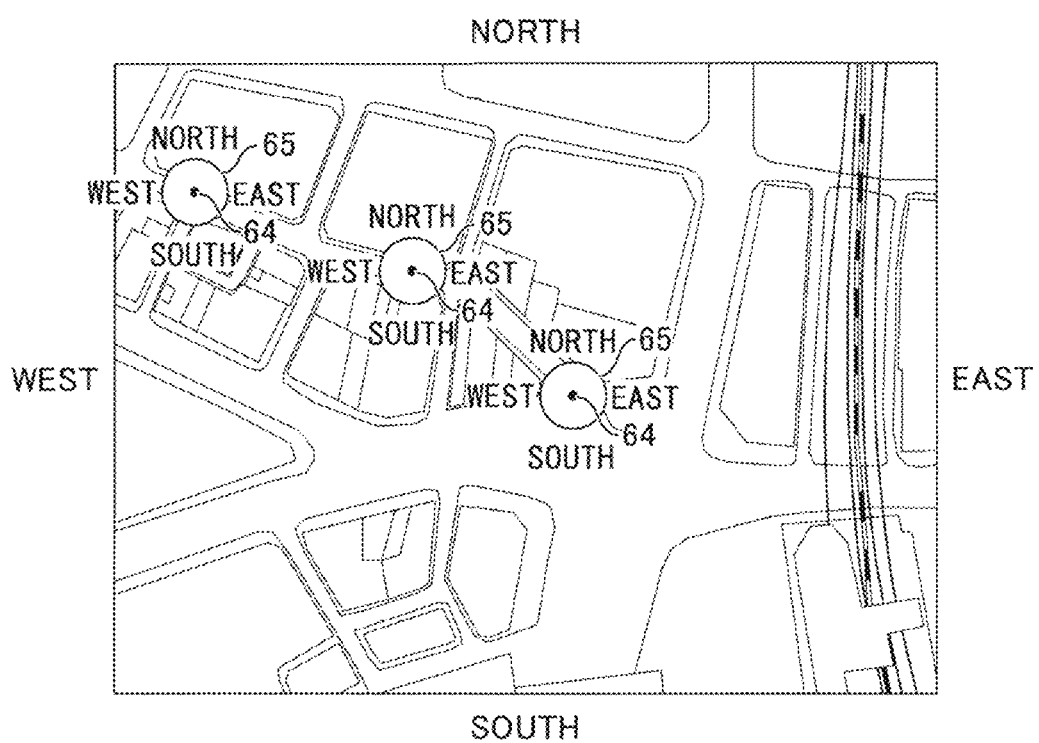
FIG. 14 is a diagram schematically illustrating embedding of spherical images in a map.

FIG. 14 is a diagram schematically illustrating embedding of spherical images in the map 62. Since the directions are attached to the spherical images, the image embedding unit 26 matches directions of spherical images 65 with directions on the map 62 and embeds the spherical images 65 in corresponding imaging locations 64 on a route in the map 62. Since the directions are attached to the spherical images 65, it is possible to embed the spherical images 65 in the map 62 in such a simple process.

<Operational Procedure>

Figure 15:
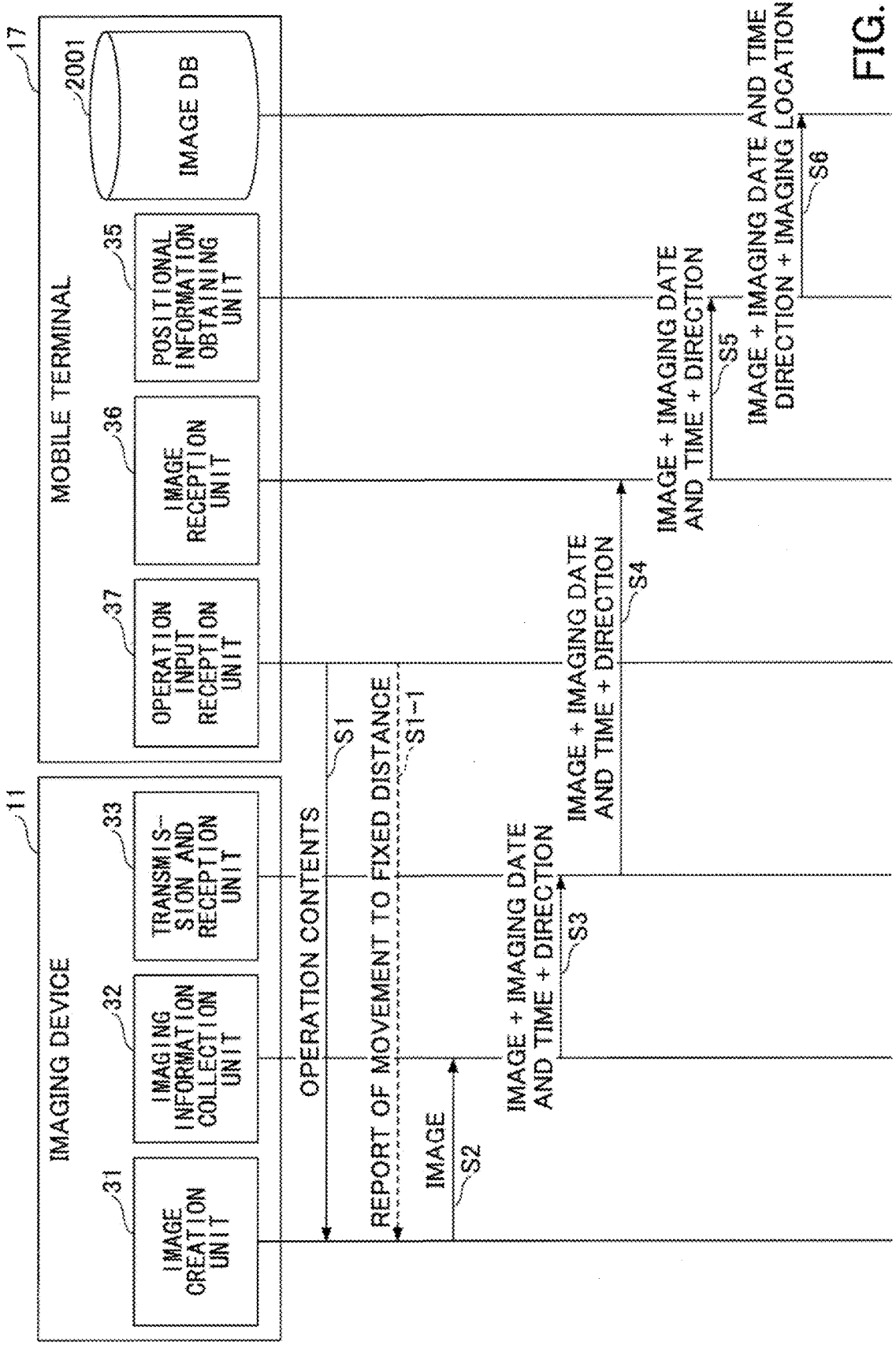
FIG. 15 is a sequence diagram of a procedure by which an imaging device transmits an image to a mobile terminal.

In the following, a procedure for transmitting an image is described with reference to steps of FIG. 15. FIG. 15 is a sequence diagram of a procedure by which the imaging device 11 transmits an image to the mobile terminal 7.

S1: When the photographer 8 operates the mobile terminal 17, the operation input reception unit 3 receives the operation and transmits operation contents to the imaging device 11. In this case, it is assumed that an operation to start taking images is performed. Further, a time to specify a cycle as imaging intervals or a distance to specify a fixed distance may be transmitted. S2: The image creation unit 31 takes an image at regular intervals or at each fixed distance and transmits the image to the imaging information collection unit 32. If the image is taken at each fixed distance, as shown in S1-1, the mobile terminal 17 reports, to the imaging device 11, that the photographer 8 has moved to the fixed distance. The movement to the fixed distance may be estimated from positional information or may be estimated from a number of steps detected by the acceleration and direction sensor 206. In accordance with this, it is possible to obtain images at substantially equal intervals on a route, so that when the end user 6 displays content, the end user 6 is likely to have a feeling as if he is actually walking. S3: The imaging information collection unit 32 collects an imaging date and time and a direction, attaches them as metadata to the image, and sends the image and the metadata to the transmission and reception unit 33. S4: The transmission and reception unit 33 transmits the image to which the imaging date and time and the direction are attached to the image reception unit 36 of the mobile terminal 17. S5: The image reception unit 36 of the mobile terminal 17 receives the image to which the imaging date and time and the direction are attached and sends them to the positional information obtaining unit 35. S6: Upon receiving the image, the positional information obtaining unit 35 obtains an imaging location and attaches it to the image. In accordance with this, the image to which imaging information is attached is obtained. The positional information obtaining unit 35 stores the image in the image DB 2001.

The imaging device 11 and the mobile terminal 17 repeat taking an image and storing the image in the image DE 2001 until the photographer 8 ends the image taking. In addition, the photographer 8 may take images a plurality of times on a single route. For example, if images are taken at morning, noon, and night, content having images taken in different time periods on the route is created. Further, the photographer 8 may take images in different situations such as the four seasons, fine weather, rainy weather, and cloudy weather on the same route.

Figure 16:
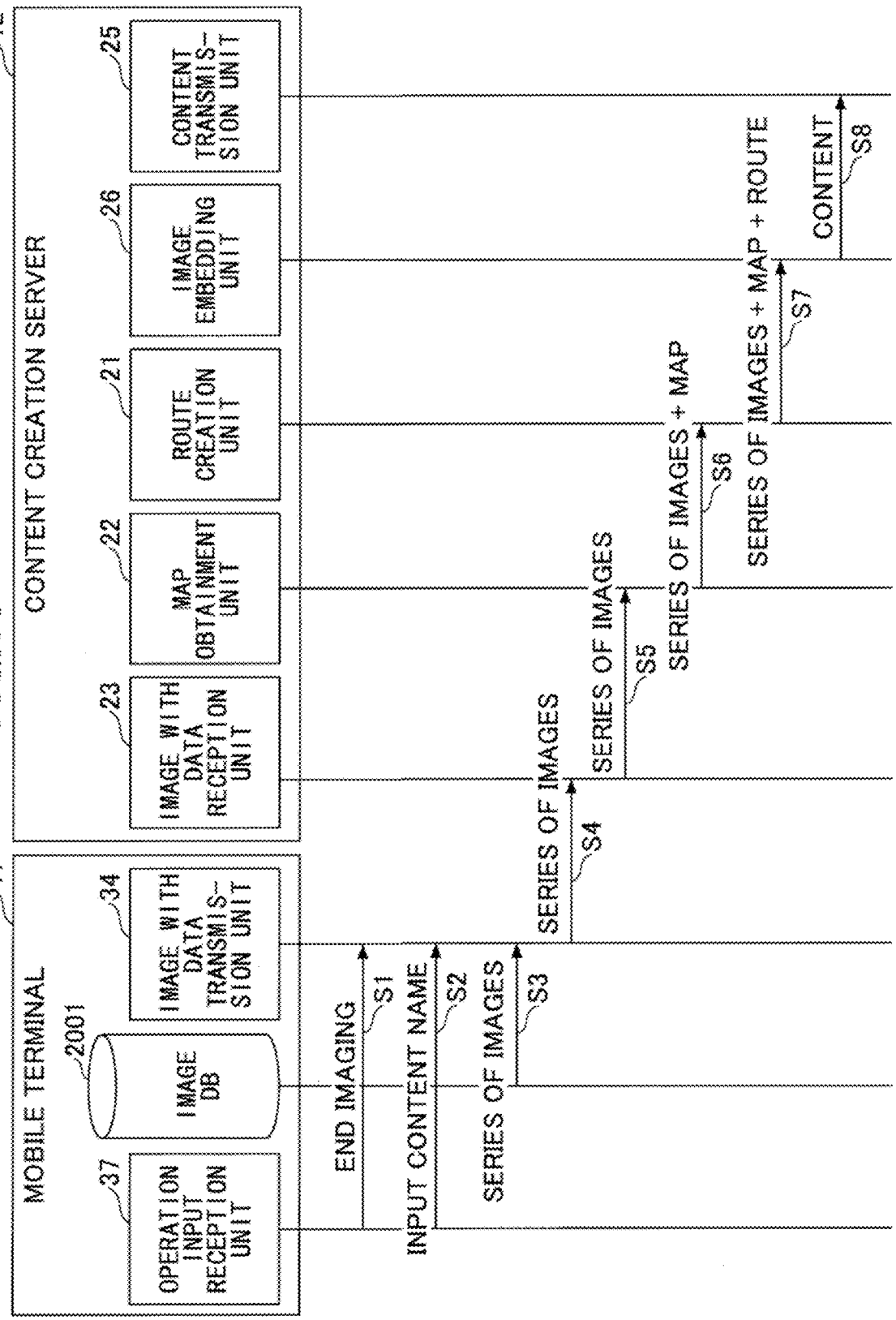
FIG. 16 is a sequence diagram of a procedure by which a mobile terminal transmits an image to a content creation server.

FIG. 16 is a sequence diagram of a procedure by which the mobile terminal 17 transmits an image to the content creation server 12.

S1: The photographer 8 performs an operation to end taking images. S2: When the operation to end taking images is performed, the mobile terminal 17 displays a dialog for inputting a content name, so that the photographer 8 inputs the content name. In addition, the content name may be input before ending taking images. Further, the photographer 8 can add an attribute of a start point of a route to any image and an attribute of an end point of the route to any image. In other words, the photographer 8 can specify the start point and the end point of the route. When these inputs end, the operation input reception unit 37 reports an end of taking images to the image with data transmission unit 34. S3: The image with data transmission unit 34 reads out a serious of images from the start to end of taking images from the image DB 2001. S4: The image with data transmission unit 34 transmits the series of images to the content creation server 12. The image with data transmission unit 34 may transmit an ID of a content-using company and a password input by the photographer 8 together with the series of images (or before or after the transmission). The content creation server 12 creates content if the photographer 8 is authenticated based on the ID of the content-using company and the password. In addition, if there is no fee charging, the authentication of the content-using company is unnecessary. S5: The image with data reception unit 23 sends the series of images to the map obtainment unit 22. S6: The map obtainment unit 22 reads out the map 62 that includes all imaging locations of the series of images from the map DB 3001 and attaches the series of images to the map 62. The map obtainment unit 22 sends the series of images to which the map 62 is attached to the route creation unit 21. S7: The route creation unit 21 maps all the imaging locations of the series of images to the map 62 and creates a route 63 by successively connecting the imaging locations in the order of imaging date and times. The route 63 is emphatically displayed with a bold line, for example. The route creation unit 21 sends the series of images to which the map 62 and the route 63 is attached to the image embedding unit 26. S8: The image embedding unit 26 embeds the series of images in the imaging locations on the route 63. Then the image embedding unit 26 sends the map 62 and the route 63 in which the images are embedded to the content transmission unit 25 as one content.

Figure 17:
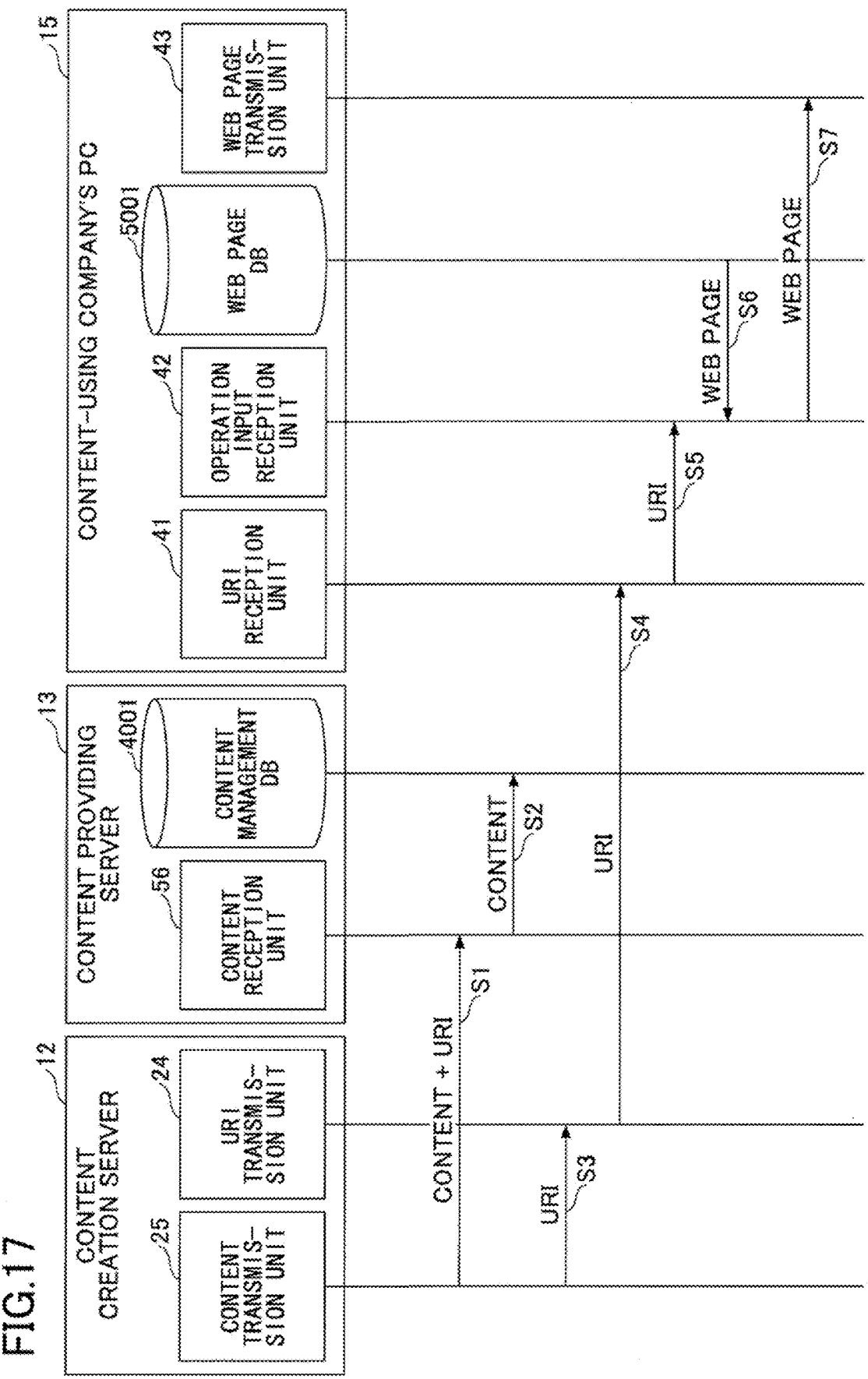
FIG. 17 is a sequence diagram of a procedure by which content and a Web page are registered.

FIG. 17 is a sequence diagram of a procedure by which content and a Web page are registered.

S1: The content transmission unit 25 specifies a URI and transmits the content to the content providing server 13. S2: The content reception unit 56 of the content providing server 13 receives the content and stores the content in the content management DB 4001 specified in the URI. In addition, the content providing server 13 may store the content in any location and transmit a URI of the storage location to the content creation server 12. S3: The content transmission unit 25 sends the URI where the content is stored to the URI transmission unit 24. S4: The URI transmission unit 24 transmits the URI to a mail address of the person 7 in charge in the content-using company. S5: The URI reception unit 41 of the content-using company's PC 15 receives mail where the URI is described and temporarily stores the mail in the RAM 303, for example. The person 7 in charge in the content-using company opens the mail to display the URI on the display screen 308, so that the operation input reception unit 42 copies the URI, for example, in response to this operation. S6: The person 7 in charge in the content-using company performs an operation to read out a desired Web page from the Web page DB 5001 and the operation input reception unit 42 reads out the Web page in response to this operation. S7: The person 7 in charge in the content-using company performs an operation to paste a copied URI on the Web page and the operation input reception unit 42 sends the Web page on which the URI is pasted to the Web page transmission unit 43.

In addition, in the procedure shown in FIG. 17, the URI is transmitted to the mail address. However, the content creation server 12 may transmit the URI to the mobile terminal 17 that has transmitted the series of images. For example, if communication such as HTTP is used, it is possible to transmit the URI to the mobile terminal 17 that has transmitted the series of images. In this case, the photographer 8 can confirm the URI without opening a mail application, for example.

Figure 18:
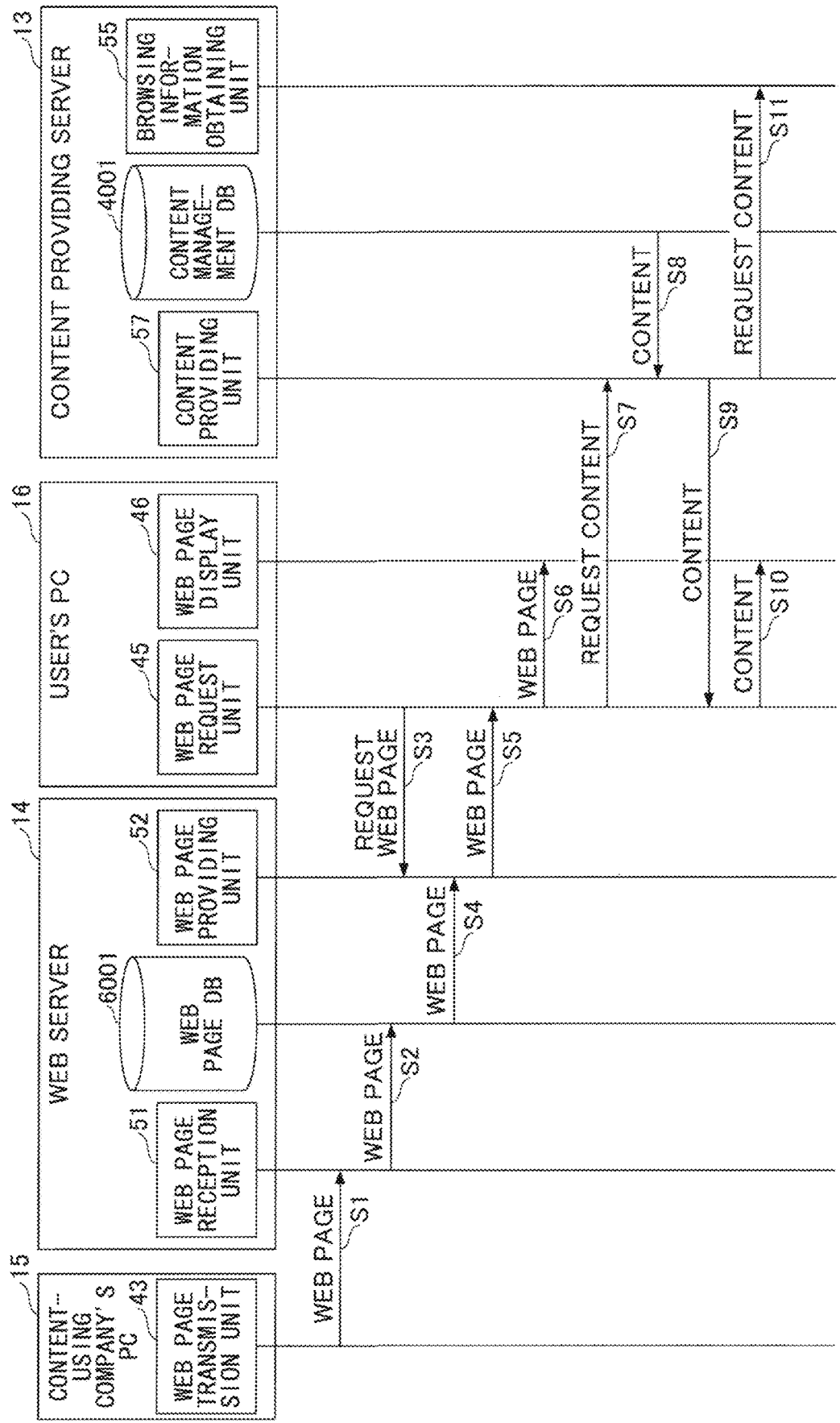
FIG. 18 is a sequence diagram of a procedure by which a user's Personal Computer (PC) displays content.

FIG. 18 is a sequence diagram of a procedure by which the user's PC 16 displays content.

S1: The Web page transmission unit 43 of the content-using company's PC 15 transmits the Web page on which the URI is pasted to the Web server 14. S2: The Web page reception unit 51 of the Web server 14 receives the Web page and stores it in the Web page DB 6001. S3: The end user 6 operates the user's PC 16 to display the Web page of the content-using company. In accordance with this, the Web page request unit 45 of the user's PC 16 specifies an address of a web site, for example, and sends a request for the Web page to the Web server 14. S4: The Web page providing unit 52 reads out the requested Web page from the Web page DB 6001. On this Web page, the URI of the content is pasted. S5: The Web page providing unit 52 transmits the Web page to the Web page request unit 45 of the user's PC 16. S6: The Web page request unit 45 of the user's PC 16 receives the Web page and sends the Web page to the Web page display unit 46. In accordance with this, the user's PC 16 can display the Web page on which the URI of the content is pasted. S7: The end user 6 moves a mouse cursor and clicks on a field prepared as an area for displaying a spherical image or clicks on an image or a character to which content is linked on the Web page, for example. If such an operation to display content is performed, the Web page request unit 45 specifies the URI and sends a request for content to the content providing server 13. S8: The content providing unit 5 of the content providing server 13 reads out the specified content from the content management BB 4001. S9: The content providing unit 57 transmits the content to the user's PC 16. S10: The Web page request unit 45 of the user's PC 16 receives the content and sends the content to the Web page display unit 46. In accordance with this, the user's PC 16 can display the content as shown in FIG. 3. In other words, the map 62 and the image 61 are displayed. When an imaging location on the route 63 within the map 62 is clicked with a mouse or tapped with the finger, it is possible to display a spherical image of the imaging location. S11: To the browsing information obtaining unit 55, the content providing unit 5 sends a report that the content is provided. The browsing information obtaining unit 55 increments a number of provisions of content. Further, the browsing information obtaining unit 55 determines a browsing time and a current time period and increments a number of people in a corresponding time period of the account management DB 3002. The content providing server 13 calculates an amount of money to charge based on the number of provisions of content and a size of content and charges the content-using company at the end of the month, for example. The browsing time and the time period of the account management DB 3002 may be provided to the content-using company with or without charge. The content-using company can use the browsing time and the time period to improve its Web page, for example.

In accordance with such a process, the end user 6 that has displayed the content can operate a menu 66 in FIG. 3 to display a partial image in a vertical direction or a horizontal direction or to successively display spherical images in different imaging locations like a movie.

As mentioned above, with the Web service system 100 according to the present embodiment, the photographer 8 can take a spherical image in a single imaging. Everyone can easily create and publish content with presence in which space of omnidirectional surroundings is expressed. Since spherical images are embedded in the imaging locations 64 on the map 62, the end user 6 can understand which imaging location the spherical image corresponds to at a glance. Further, since the route 63 is displayed on the map 62, the end user 6 can understand at a glance that the route 63 can be checked with the spherical images. It is possible to provide the end user 6 with a simulated experience of touring on the route 63 by replaying an omnidirectional panoramic image. Further, an operator of the content providing server 13 can charge the content-using company depending on a size of content and the number of provisions of content.

Embodiment 2

While the photographer 8 can take an image of surroundings in any location as described in Embodiment 1, the faces of passersby may be captured in images. If personal specific information about the passersby is captured in the images, this is undesirable in terms of protection of privacy. In view of this, in this embodiment, the Web service system 100 performs an image process on the faces of passersby in order to make identification or determination of persons more difficult.

Figure 19:
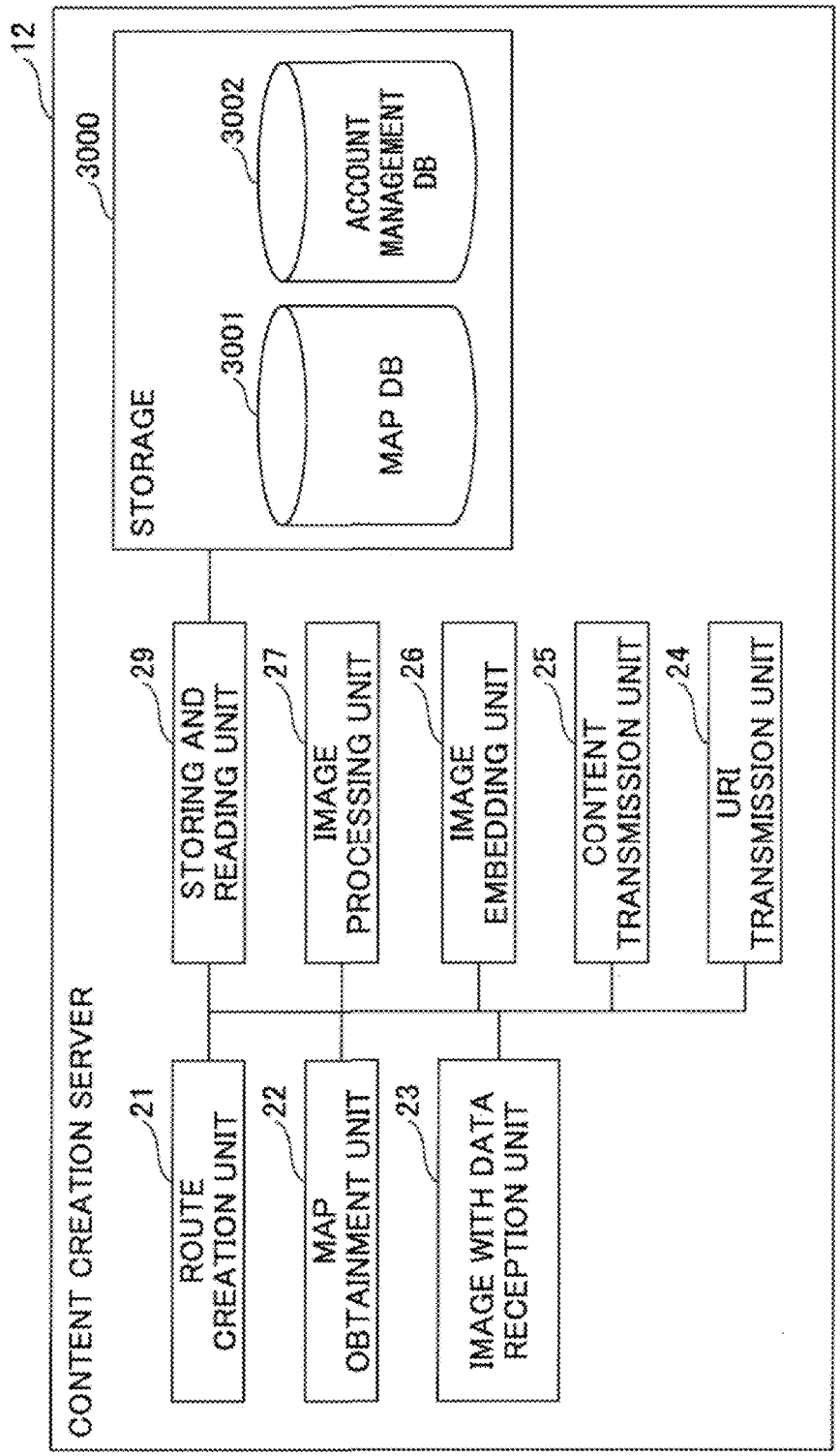
FIG. 19 is a functional block diagram of a content creation server (Embodiment 2)

FIG. 19 is a functional block diagram of the content creation server 12 according to the present embodiment. In the present embodiment, since constituent elements provided with the same reference numerals fulfil the same functions, only main constituent elements of the present embodiment may be described. In FIG. 19, the content creation server 12 includes an image processing unit 27. In addition, an image process may be performed by the mobile terminal 17 or the content providing server 13.

The image processing unit 27 is implemented by an instruction from the CPU 301 shown in FIG. 8, for example. The image processing unit 27 detects the face from an image and performs a blur process on the face. The blurring of the face refers to making identification or determination of an individual difficult. For such a blur process, a smoothing filter may be used for smoothing or an image for hiding the face may be superimposed on a face part. In addition, the detection of the face is performed when a rectangular frame is set for an image and an evaluation value of the rectangular frame is calculated based on Haas-like features or FOG features, for example. By performing an evaluation based on features while shifting the rectangular frame, it is possible to determine a rectangular frame that has a high probability of having the face captured therein.

FIG. 20 is a sequence diagram of a procedure by which the content creation server 12 creates content.

S4-2: The image processing unit 27 performs an image process on all of a series of images. Further, it is not necessary to perform the image process before obtaining the map 62. The image process may be performed before transmitting the content.

Figure 21A:
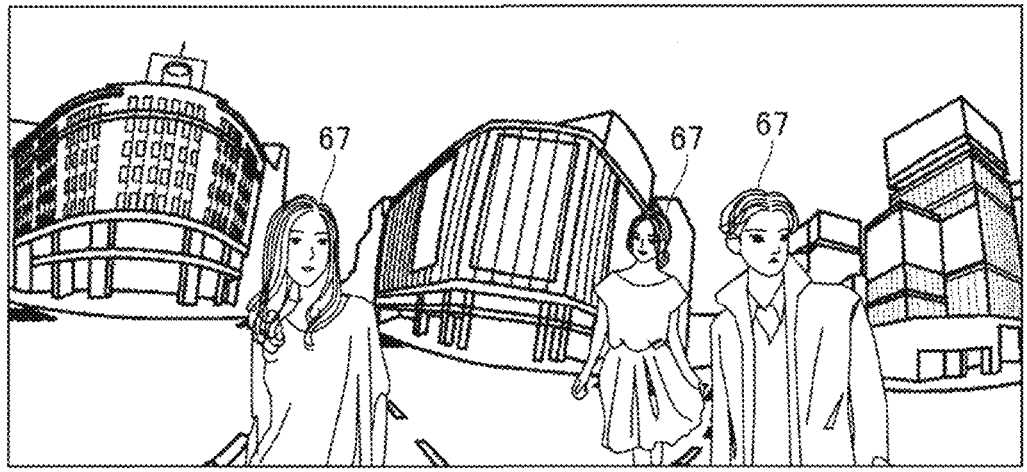
FIG. 21A is a diagram illustrating an image process to protect privacy.
Figure 21B:
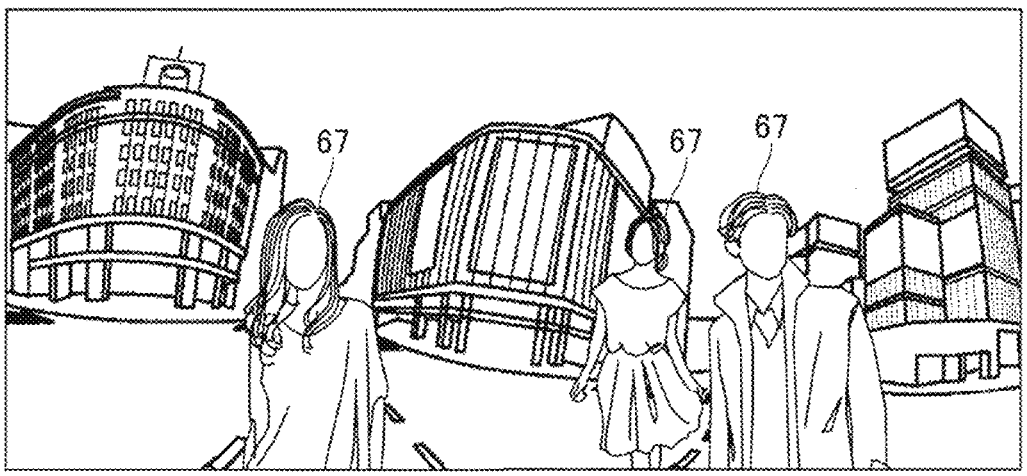
FIG. 21B is a diagram illustrating an image process to protect privacy.

FIGS. 21A and 21B are diagrams illustrating an image process to protect privacy. FIG. 21A shows a partial image before an image process is performed. FIG. 21B shows the partial image after the image process is performed. In FIG. 21B, it is difficult to recognize the faces of three passersby 67.

While the image process is performed only on the faces of the passersby 67 in FIG. 21B, if a person is shown on a billboard or on a large liquid crystal display in the image, the image process is performed also on these parts. In accordance with this, it is possible to protect copyrights of advertisements and portrait rights of individuals. Further, personal specific information is not limited to the faces, so that it is preferable to detect information that can identify individuals such as number plates of vehicles and perform an image process.

As mentioned above, in addition to the effects of Embodiment 1, the Web service system 100 according to the present embodiment can protect, privacy even if the photographer S takes an image of the passersby 67.

Embodiment 3

When the end user 6 displays a spherical image on the user's PC 16, various objects are captured in an image. It is useful if the end user 6 can display information about these objects. Accordingly, in the present embodiment, the Web service system 100 embeds information about the captured objects in the spherical image.

Figure 22:
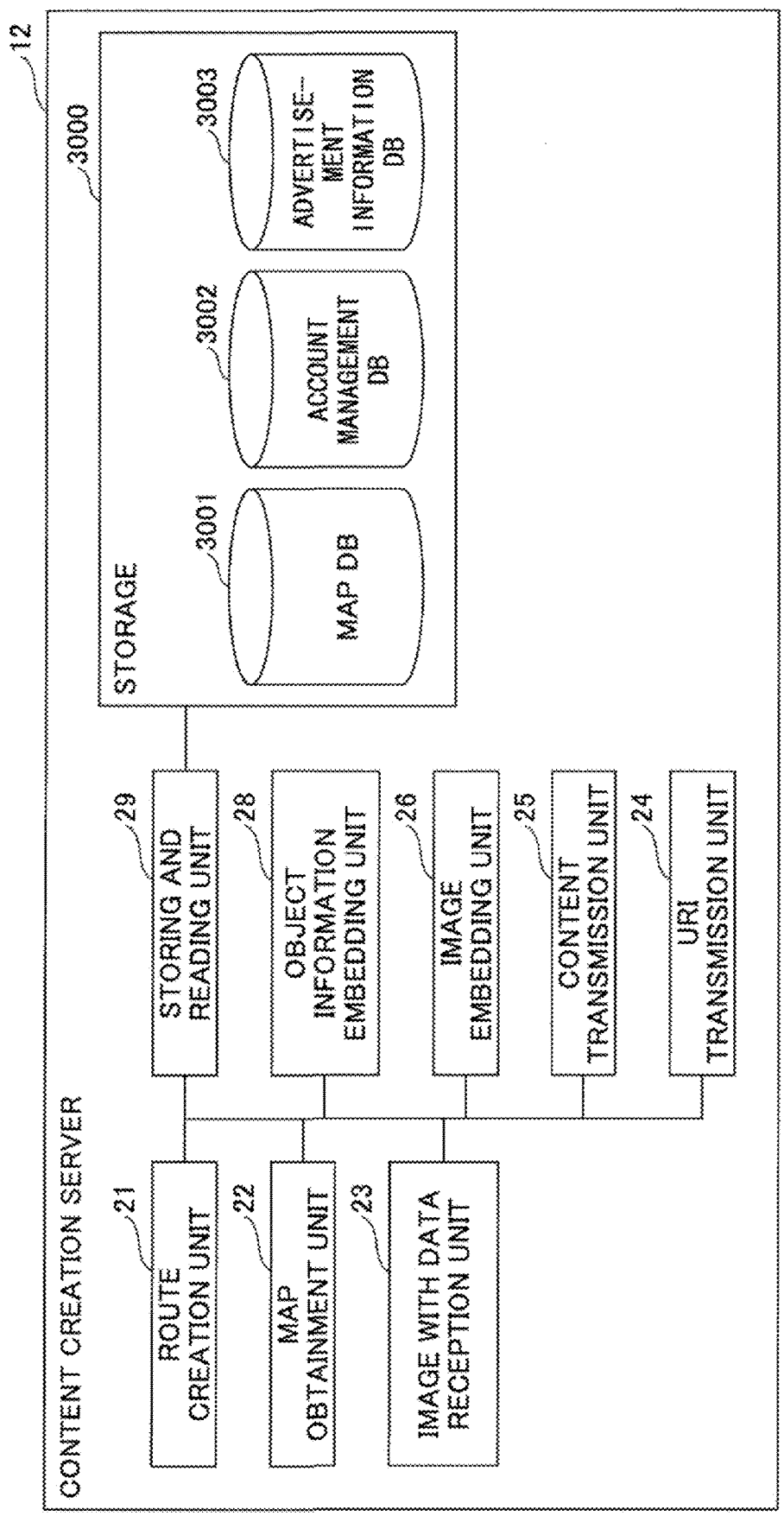
FIG. 22 is a functional block diagram of a content creation server (Embodiment 3)

FIG. 22 is a functional block diagram of the content creation server 12 in the present embodiment. In FIG. 22, the content creation server 12 includes an object information embedding unit 28. The object information embedding unit 28 is implemented by art instruction from the CPU 301 shown in FIG. 8, for example. The object information embedding unit 28 detects a building from a spherical image, identifies a location of the building on a map, and embeds building information about the building obtained from the map DB 3001 and the following advertisement information obtained from an advertisement information DB 3003 in the building. Information that enables the end user 6 to understand what an object is or information about an object to be provided to the end user 6 is referred to as object information. At least one of the building information and the advertisement information is a specific example of the object information. The object information embedding unit 28 is an example of an object information association unit.

Further, the content creation server 12 according to the present embodiment includes the advertisement information DB 3003 in the storage 3000. In the advertisement information DB 3003, an advertisement information table is registered as shown in Table 3.

TABLE 3

| IDs of buildings | IDs of advertisement companies | Advertisement information | Number of provisions |
|---|---|---|---|
| K001 | C001 | Advertisement URL | Nc01 |
| K001 | C002 | Advertisement URL | Nc02 |
| K001 | C003 | Advertisement URL | Nc03 |

In the advertisement information table, IDs of buildings, IDs of advertisement companies, advertisement information, and numbers of provisions are registered. IDs of the buildings are identification information (an example of object identification information) to uniquely identify buildings on a map. The IDs of advertisement companies are identification information to uniquely identify advertisement companies that place an advertisement. The advertisement information describes contents of an advertisement (URL to display advertisement contents in Table 3) that an advertising company displays. The numbers of provisions indicate how many times advertisement information is selected by the end user 6.

In the following, embedding of object information is described with reference to FIGS. 23A to 24. FIGS. 23A to 23C are diagrams illustrating how to identify a location of a building on a map. FIG. 23A shows a partial image of a spherical image. The object information embedding unit 28 performs an edge process, for example, and horizontally traces pixels at highest imaging positions in objects. In accordance with this, a trace line S8 shown in FIG. 23A is obtained. It is possible to determine that there is a building at a place where a vertical pixel position of an object is equal to a threshold 82 or more. Further, one building is indicated from a place where the pixel position of an object is less than the threshold 82 to a next place where the pixel position of the object is less than the threshold 82. In order to deal with a place where buildings are continuously arranged, vertically continuous edges may be detected using Hough transform, for example, and a building may be separated at a location where edges continue from the sky closer to the ground. Further, the building may be separated based on a color of the building. In FIG. 23A, it is assumed that buildings 71 to 73 are detected.

Further, as shown in FIG. 23B, north, south, east and west and an imaging location are attached to a spherical image. Accordingly, it is clear that in which direction, the buildings 71 to 73 are present when seen from the imaging location.

FIG. 23C is a diagram illustrating an imaging range 83 on a map. Since directions of the buildings 71 to 73 seen from the imaging location are known, it is possible to identify the buildings 71 to 73 on the map applying the directions to the map. For example, with reference to true north, a direction of the building 71 is about 260 degrees, a direction of the building 72 is about 310 degrees, and a direction of the building 73 is about 5 degrees (clockwise).

When the object information embedding unit 28 identifies the buildings 71 to 73 on the map, the object information embedding unit 28 obtains building information about respective buildings from the map DB 3001 and embeds the building information in the buildings of the spherical image. The building information includes a name of the building and names of tenants of the building, fox example.

Specifically, a JavaScript (registered trademark) code, for example, is described in content such that the building information is displayed when the end user 6 clicks on, taps, or hovers a mouse cursor over the buildings 71 to 73 in an image included in the content.

If advertisement information for the buildings 71 to 73 is registered in the advertisement information DB 3003, the advertisement information is embedded in the same manner. However, if the advertisement information is embedded, a JavaScript (registered trademark) code, for example, is described in the content such that an ID of an advertising company and a fact that an advertisement is selected are reported to the content providing server 13.

Figure 24:
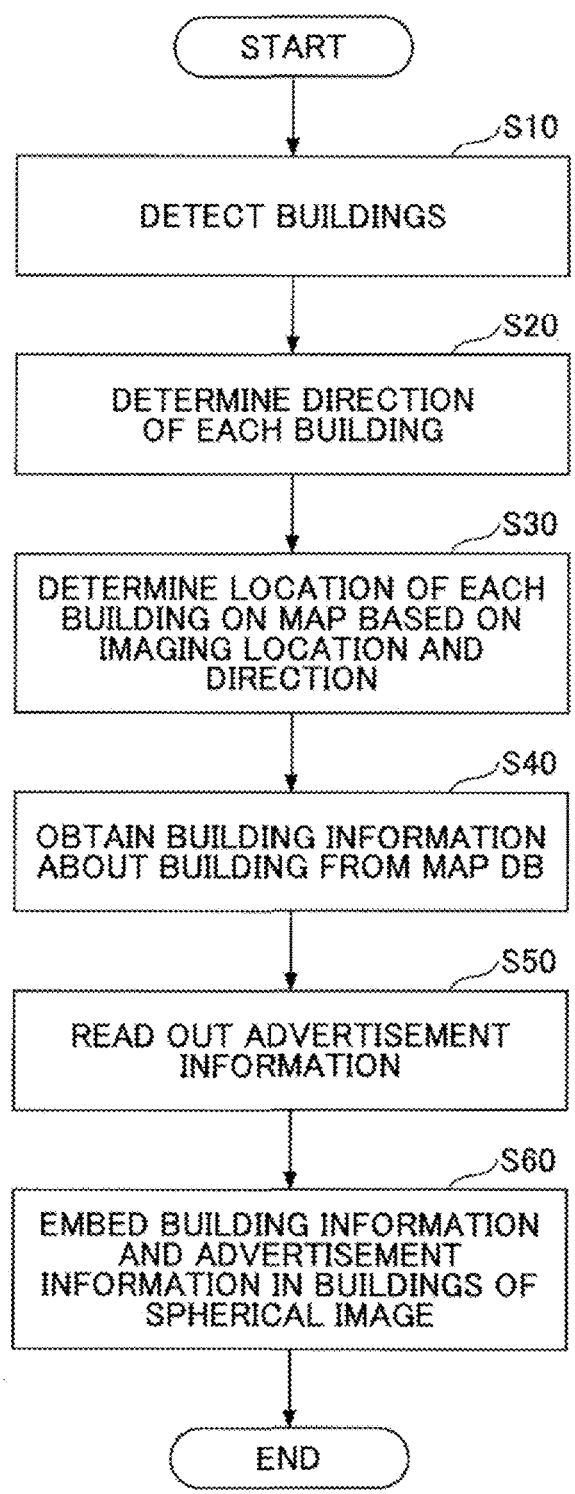
FIG. 24 is a flowchart of a procedure by which an object information embedding unit embeds object information in a spherical image.

FIG. 24 is a flowchart of a procedure by which the object information embedding unit 28 embeds object information in a spherical image. The procedure of FIG. 24 starts between a time when the content creation server 12 receives an image and a time when the content creation server 12 transmits content.

The object information embedding unit 28 detects buildings from a spherical image (S10).

The object information embedding unit 28 determines a direction of each building seen from an imaging location based on directions of the spherical image (S20).

The object information embedding unit 28 determines a location of the building on the map based on the imaging location and the direction of each building (S30).

From the map DB 3001, the object information embedding unit 28 obtains building information about the building identified on the map (S40).

From the advertisement information DB 3003, the object information embedding unit 28 reads out advertisement information associated with an ID of the building (S50).

The object information embedding unit 28 embeds the building information and the advertisement information in the buildings of the spherical image (S60).

Figure 25:
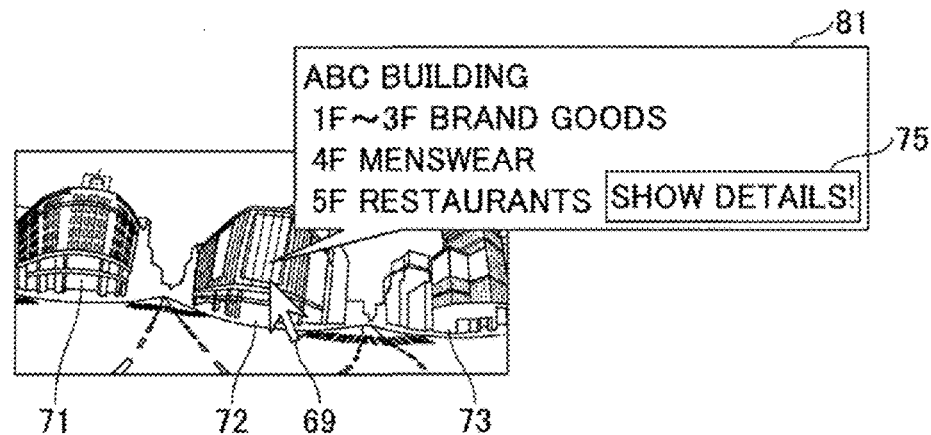
FIG. 25 is a diagram showing object information to be displayed when an end user clicks on a building using a mouse cursor.

FIG. 25 is a diagram showing object information 81 to be displayed when the end user 6 clicks on the building 72 using a mouse cursor 69. In FIG. 25, a name of the building, names of tenants, and an advertisement button 75 are displayed. If the end user 6 wishes to know detailed information about restaurants, for example, the end user 6 selects the advertisement button 75. Advertisement information (advertisement URL) from the advertisement information DB 3003 is embedded in the advertisement button 75, so that the user's PC 16 can display a Web page where the detailed information about the restaurants is given.

Further, when the advertisement button 75 is selected, the user's PC 16 executes JavaScript (registered trademark) code, for example, and reports an ID of an advertising company and the fact that an advertisement is displayed to the content providing server 13. The browsing information obtaining unit 55 of the content providing server 13 counts a number of reports and updates the number of provisions in the advertisement information DB 3003. In accordance with this, an operator of the Web service system 100 can charge the adverting company for an advertisement cost depending on the number of provisions of advertisement.

As mentioned above, in addition to the effects of Embodiment 1, the Web service system 100 according to the present embodiment embeds object information in objects of a spherical image, so that the end user 6 can display information about the objects.

<Application Examples of Web Service System 100>

While preferred embodiments of the present invention are described with examples as mentioned above, the present invention is not limited to these examples at all. Various modifications and replacements can be added without departing from the scope of the present invention.

For example, in the present embodiment, the content providing server 13 specifies the content-using company. However, a user of content may not be specified. In other words, any consumer can transmit an image to the content creation server 12 and provide the image on her/his own Web page.

Further, in the above-mentioned examples, outdoor imaging and outdoor images are described as examples. However, locations of imaging may be indoors. In this case, imaging locations may use positional information based on iBeacon (registered trademark) in addition to IMES mentioned above.

Figure 26:
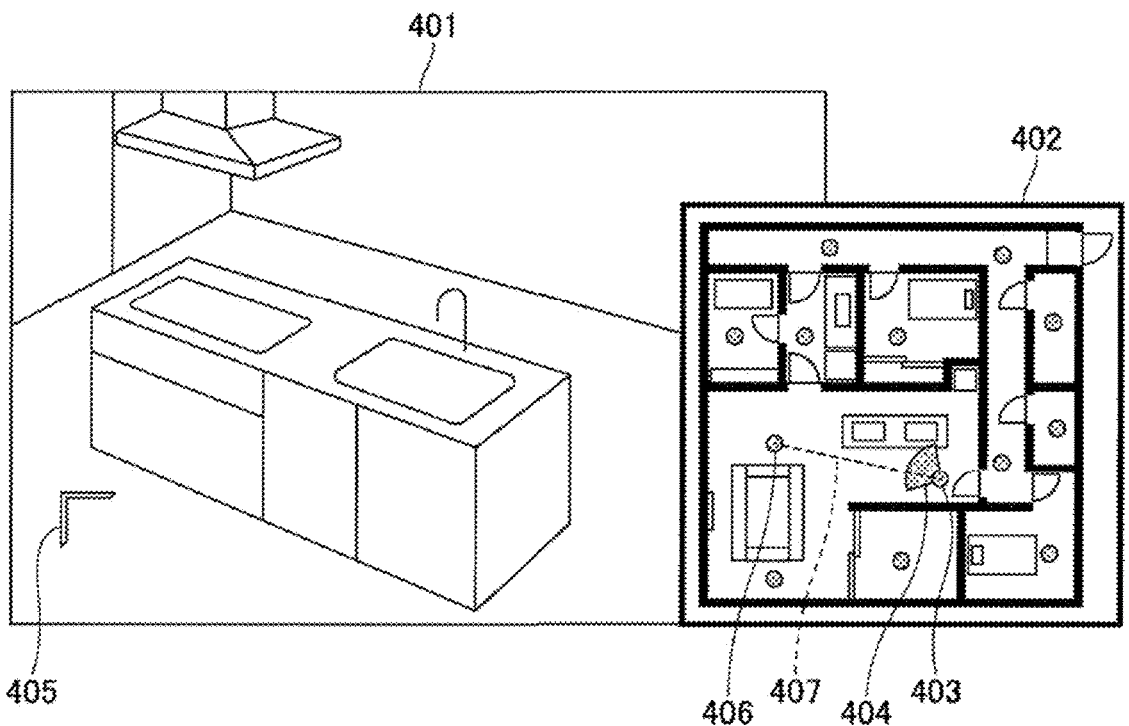
FIG. 26 is a diagram illustrating content displayed on a user's PC.

When the Web service system 100 publishes indoor images, it is possible to create content in the same manner as outdoor images. FIG. 26 is a diagram illustrating content displayed on the user's PC 16. The content shown in FIG. 26 includes a display field 401 for displaying a spherical image and a display field 402 for displaying an indoor map.

First, since imaging locations of spherical images are known, if coordinates on the indoor map (such as coordinates of a two-dimensional coordinate system with an origin at an upper left corner of the indoor map) are associated with positional information, it is clear which spherical image corresponds to which coordinates on the indoor map. Further, directions of north, south, east and west are attached to the spherical images, and north, south, east and west of the indoor map are usually known. Accordingly, the content creation server 12 can identify both an imaging location on the indoor map and a front side of the imaging device 11, so that an imaging direction becomes clear.

In the display field 402 for displaying the indoor map, these types of information are used to display a figure 403 that indicates the imaging location on the indoor map where the spherical image is taken and a figure 404 that indicates a direction (angle of view) in which the spherical image is displayed in the display field 401. In addition, a partial image Im of the spherical image being displayed in the display field 401 is known to the user's PC 16, so that the user's PC 16 can identify a direction of display with reference to the imaging direction of the imaging device 11.

Accordingly, depending on the imaging location of the spherical image being displayed in the display field 401, the user's PC 16 can emphatically display the figure 403 in the display field 402 (in this case, the figure 403 is made obvious with the figure 404 but may be emphatically displayed, with a different color, for example), Further, depending on the partial image Im of the spherical image being displayed in the display field 401, the user's PC 16 can change a direction of the figure 404 in the display field 402 to correspond to the partial image Im. Accordingly, a user who operates the user's PC 16 can easily understand in which location on the indoor map the image being displayed in the display field 401 is taken and which direction is displayed in the display field 401.

Further, a figure 405 that indicates a preferable or possible movement direction is displayed in the display field 401 of FIG. 26. The movement direction refers to a direction if the user is assumed to move in an indoor space although the user does not actually move in the indoor space. The user's PC 16 calculates a straight line 407 connected to the imaging location of the current spherical image and an imaging location of an adjacent spherical image on the indoor map, for example, and displays, in the display field 401, the figure 405 in a portion that must have been captured in a spherical image if the straight line 407 exists. Since it is possible to estimate a direction of the straight line 407, the figure 405 is superposed and displayed close to the floor in this direction of the spherical image. In this manner, a direction of the imaging location of the adjacent spherical image is indicated by the figure 405 in the current spherical image displayed In the display field 401.

Further, the content creation server 12 associates (by embedding a link, for example) in advance the adjacent spherical image having a figure 406 on the indoor map as an imaging location thereof with the figure 405.

When the user selects the figure 405, the user's PC 16 detects the association and switches the current spherical image being displayed in the display field 401 to the adjacent spherical image having the figure 406 as the imaging location, the adjacent spherical image being located ahead of the figure 405. For example, if the figure 405 is selected in FIG. 26, the spherical image taken in a location of the figure 406 on the indoor map will be displayed.

Further, if the content creation server 12 displays the figure 405 that indicates a movement direction only in a direction in the display field 401 where the user is desirably guided, it is possible to allow the user to browse spherical images in a preferable order. In the same manner as outdoor images, if the user selects the figure 403 or 406 that indicates an imaging location on the indoor map, the spherical image taken in the imaging location selected by the user is displayed in the display field 401. In this case, the content creation server 12 associates the spherical images with the figures 403 and 406 that indicate the imaging locations in advance.

Further, in the above-mentioned examples, the photographer is assumed to walk. However, the imaging device 11 may be installed on a vehicle and take an image of surroundings from the vehicle.

Further, a place of imaging is not limited to the ground. It is possible to perform aerial imaging while falling by parachute or flying a paraglider. Further, it is possible to take an image in a pool or in the sea. In the case of taking an image in a place other than on the ground in this manner, preferably, not only longitude and latitude but also altitude information are measured and attached to an image.

Further, in the above-mentioned examples, the user's PC 16 displays content via a Web page. However, the contents may be directly displayed without using the Web page.

Further, in the above-mentioned examples, still images are mainly used as examples. However, if a movie is to be provided as content, the content providing server 13 may extract some scenes from the movie and emphatically display them on a corresponding imaging location on the map 62. The scenes may include a spherical image whose evaluation value of picture quality is equal to a standard or more. Alternatively, the person 7 in charge in the content-using company may select some scenes.

In addition, the image with data transmission unit 34 is an example of a first or second transmission unit, the image with data reception unit 23 is an example of a reception unit, the map obtainment unit 22 is an example of a map data obtaining unit, the route creation unit 21 is an example of a path information creation unit, and the content providing unit 57 is an example of a content providing unit. The URI transmission unit 24 is an example of a link information transmission unit, the Web page reception unit 51 is an example of a public information reception unit, and the Web page providing unit 52 is an example of a public information providing unit. The browsing information obtaining unit 55 is an example of a content counter or an advertisement counter, the image processing unit 27 is an example of an image processing unit, the image embedding unit 26 is an example of an image association unit, and the object information embedding unit 28 is an example of an object information association unit. The image creation unit 31 is an example of an imaging unit, the transmission and reception unit 33 is an example of a second transmission unit, the positional information obtaining unit 35 is an example of a position detection unit, and the operation input reception unit 37 is an example of a setting reception unit. The map DB 3001 is an example of a map data storage and the advertisement information DB 3003 is an example of an advertisement information storage. The Web service system 100 is an example of a service system and a method performed by the Web service system 100 is an example of a service providing method.

Further, the present invention is not limited to these embodiments, and various variations and modifications may be made without departing from the scope of the present invention.

The present application is based on and claims the benefit, of priorities of Japanese Priority Application No. 2014-247212 filed on Dec. 5, 2014 and Japanese Priority Application No. 2015-227585 filed on Nov. 20, 2015, the entire contents of which are hereby incorporated by reference.

The invention claimed is:

1. A system, comprising:
an imaging device configured to capture images and capture a map of a physical location, the map indicating imaging locations of the captured images; and
circuitry configured to
receive a display request from a terminal connected via a network,
read a first image of the captured images and a particular map indicating an imaging location of the first image from the memory, based on the display request, and
transmit, to the terminal, the first image and the particular map, the particular map including a first figure indicating the imaging location of the first image, and the first image including a second figure indicating a direction to an imaging location of a second image, of the captured images, that is adjacent to the first image.

2. The system according to claim 1, wherein the particular map transmitted to the terminal includes a third figure indicating an angle of view at which the first image is displayed.

3. The system according to claim 1, wherein the particular map transmitted to the terminal includes a plurality of first figures indicating respective imaging locations of a plurality of the captured images.

4. The system according to claim 1, wherein the second figure is displayed on the first image along a direction from the first image to the second image.

5. The system according to claim 1, wherein the imaging device is an omni-directional imaging device including at least two imaging elements.

6. A terminal connected to a server via a network, the terminal comprising:
circuitry configured to
transmit a display request to the server,
receive a first image and a particular map indicating an imaging location of the first image, the first image and the particular map being transmitted from the server in accordance with the display request, and
display the received first image and the particular map, the particular map including a first figure indicating the imaging location of the first image, and the first image including a second figure indicating a direction to an imaging location of a second image that is adjacent to the first image,
wherein the first image, the second image, and the particular map are captured by an imaging device and stored in a memory, the particular map indicating imaging locations of the first and second images.

7. The terminal according to claim 6, wherein
when the first image is displayed on the terminal, the circuitry is further configured to display, on the particular map, a third figure indicating an angle of view at which the first image is displayed.

8. The terminal according to claim 6, wherein the displayed particular map includes a plurality of first figures indicating respective imaging locations of a plurality of the captured images.

9. The terminal according to claim 6, wherein the second figure is displayed on the first image along a direction from the first image to the second image.

10. The terminal according to claim 6, wherein the circuitry is configured is configured to receive the first image and the particular map, which are captured by an omni-directional imaging device including at least two imaging elements.

11. A method, comprising:
acquiring, using an imaging device, captured images and a map of a physical location, the map indicating imaging locations of the captured images;
receiving a display request from a terminal via a network;
reading a first image of the captured images and a particular map indicating an imaging location of the first image from the memory, based on the display request; and
transmitting, to the terminal, the first image and the particular map, the particular map including a first figure indicating the imaging location of the first image, and the first image including a second figure indicating a direction to an imaging location of a second image, of the captured images, that is adjacent to the first image.

12. The method according to claim 11, further comprising:
when the first image is displayed on the terminal, displaying, on the particular map, a third figure indicating an angle of view at which the first image is displayed.

13. The method according to claim 11, wherein the displayed particular map includes a plurality of first figures indicating respective imaging locations of a plurality of the captured images.

14. The method according to claim 11, wherein
the second is displayed on the first image along a direction from the first image to the second image.

15. The method according to claim 11, wherein the acquiring step comprises acquiring the captured images and the map using the imaging device, which is an omni-directional imaging device including at least two imaging elements.

16. A non-transitory computer-readable storage medium including computer executable instructions, wherein the instructions, when executed by a computer, cause the computer to perform a method, the method comprising:
storing, in a memory, captured images and a map of a physical location, the map indicating imaging locations of the captured images;
receiving a display request from a terminal via a network;
reading a first image of the captured images and a particular map indicating an imaging location of the first image, from the memory, based on the display request; and
transmitting, to the terminal, the first image and the particular map, the particular map including a first figure indicating the imaging location of the first image, and the first image including a second figure indicating a direction to an imaging location of a second image, of the captured images, that is adjacent to the first image.

17. The non-transitory computer-readable storage medium according to claim 16, further comprising:
when the first image is displayed on the terminal, displaying, on the particular map, a third figure indicating an angle of view at which the first image is displayed.

18. The non-transitory computer-readable storage medium according to claim 16, wherein the displayed particular map includes a plurality of first figures indicating respective imaging locations of a plurality of the captured images.

19. The non-transitory computer-readable storage medium according to claim 16, wherein the second figure is displayed on the first image along a direction from the first image to the second image.

20. The non-transitory computer-readable storage medium according to claim 16, wherein the acquiring step comprises acquiring the captured images and the map using the imaging device, which is an omni-directional imaging device including at least two imaging elements.

* * * * *